United States Patent [19]

Tsutsumi et al.

[11] Patent Number: 5,193,144
[45] Date of Patent: Mar. 9, 1993

[54] FUZZY SYSTEM

[75] Inventors: Yasuhiro Tsutsumi; Yutaka Ohtsubo, both of Takatsuki, Japan

[73] Assignee: Shimano, Inc., Osaka, Japan

[21] Appl. No.: 449,717

[22] Filed: Dec. 12, 1989

[30] Foreign Application Priority Data

| Dec. 14, 1988 | [JP] | Japan | 63-315360 |
| Feb. 7, 1989 | [JP] | Japan | 1-28373 |
| Mar. 17, 1989 | [JP] | Japan | 1-67161 |

[51] Int. Cl.$^5$ .......................... G06F 15/00; G06F 9/44
[52] U.S. Cl. ................................ 395/76; 395/12; 395/61; 395/900
[58] Field of Search ................ 364/513, 200, 150; 395/75, 76, 77, 900, 61, 12

[56] References Cited

U.S. PATENT DOCUMENTS

| 4,648,044 | 3/1987 | Hardy et al. | 364/513 |
| 4,837,725 | 6/1989 | Yamakawa | 364/807 |
| 4,860,213 | 8/1989 | Bonissone | 364/513 |

FOREIGN PATENT DOCUMENTS

| 63-123102 | 5/1988 | Japan . |
| 01103704 | 4/1989 | Japan . |
| 01103705 | 4/1989 | Japan . |
| 01103706 | 4/1989 | Japan . |
| 01103707 | 4/1989 | Japan . |
| 0111357A | 5/1989 | Japan . |
| 01206142 | 8/1989 | Japan . |

OTHER PUBLICATIONS

Procyk et al., "A Linguistic Self-Organizing Process Controller", *Automatica*, V. 15 Jan. 1979 pp. 15-30.

Yamazaki et al., "A Microprocessor Based Fuzzy Controller for Industrial Purposes", *Industrial Applications of Fuzzy Control*, Sugeno, M. (Ed.), Elsevir, 1985, pp. 231-239.

Primary Examiner—Allen R. MacDonald
Attorney, Agent, or Firm—Dickstein, Shapiro & Morin

[57] ABSTRACT

A membership function unit includes a membership function setting section for adjusting positions or shapes of membership functions depending on inputs of elements influencing human senses so as to set the membership functions and a membership value computing section for computing membership function values associated with input variables in the membership functions attained by the membership function setting section.

2 Claims, 25 Drawing Sheets

FIG. 14

FUZZY SIMULATOR

| UTILITY | FILE | KNOWLEDGE | SIMULATION | HARDCOPY | END |

FILE REFERENCE

MSF FILE NAME : ■sfabc
INPUT VORIABLE NAME COUNT : 20    OUTPUT VARIABLE NAME COUNT : 10
COMMENT : SIMULATION MSF 1

| VARIABLE NAME | I/O | UNIT | LOWER LIMIT VALUE | UPPER LIMIT VALUE | COMMENT/FUZZY LABEL |
|---|---|---|---|---|---|
| ■ dx001 | i | Km/H | -40 | 40 | DEVIATION FROM TARGET(R1)<br>NL NM NS ZR PS PM PL |
| □ ddx01 | i | Km/H | -5 | 5 | DIFFERENTIAL OF dx001<br>NL NM NS ZR PS PM PL |
| □ out01 | o | V | -12 | 12 | MANIPULATED VARIABLE 1<br>NL NM NS ZR PS PM PL |

SUBMENU
RULE REFERENCE
M S F REFERENCE

1/1

EXIT

CLICK □ BY RIGHT BATTON OF MOUSE TO SELERT VARIABLE NAME.

FIG. 15

FUZZY SIMULATOR

| UTILITY | FILE | KNOWLEDGE | SIMULATION | HARDCOPY | END |

FILE REFERENCE

RULE FILE NAME : rulabc
RULE COUNT : 20
COMMENT : SIMULATION RULE 1

| No. | ANTECEDENT | CONSEQUENT |
|---|---|---|
| 1 | IF aaaaa-ns1 & bbbbb-ps1 & ccccc-zr<br>& ddddd-ps2 & eeeee-nm1 & fffff-pm1 | THEN uuuuu-pb<br>& vvvvv-nm2 |
| 2 | IF ggggg-nm2 & hhhhh-ns1 & iiiii-ps1 | THEN wwwww-ns2<br>& xxxxx-nb1 |
| 3 | IF jjjjj-pb2 & kkkkk-ps2 & lllll-ns | THEN uuuuu-ns3 |
| 4 | IF mmmmm-ns3 & ooooo-ps3 & ppppp-zr2<br>qqqqq-nm | THEN vvvvv-nm4 |
| ... | | |

SUBMENU
RULE REFERENCE
M S F REFERENCE

1 / 1

EXIT

CLICK △▽ BY RIGHT BUTTON OF MOUSE TO CHANGE PAGE.

Fig.17

$x(t) = A \cdot x(t) + B \cdot u(t)$ $ya(t) = C \cdot x(t)$ $yO(t) = ya(t-L)$ $y(t) = yO(t) + dO(t)$ $u(t) = uc(t) + dl(t)$ A, B, C : SYSTEM MATRICES
x(t) : STATE AMOUNT
yO(t) : PLANT OUTPUT
y(t) : CONTROL AMOUNT
dO(t) : EXTERNAL DISTURBANCE ON OUTPUT SIDE
L : IDLE TIME
uc(t) : CONTROLLER OUTPUT (MANIPULATED VARIABLE)
dl(t) : EXTERNAL DISTURBANCE ON INPUT SIDE
u(t) : PLANT INPUT

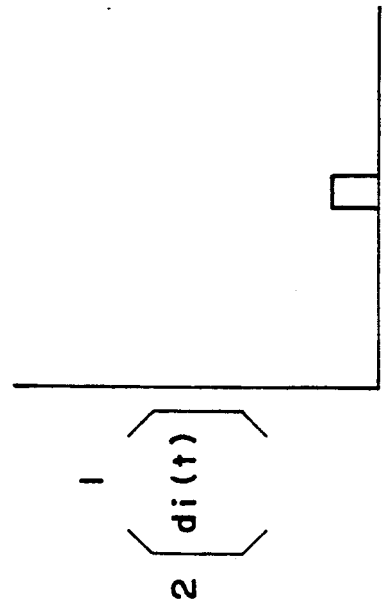
Fig.18a(2)
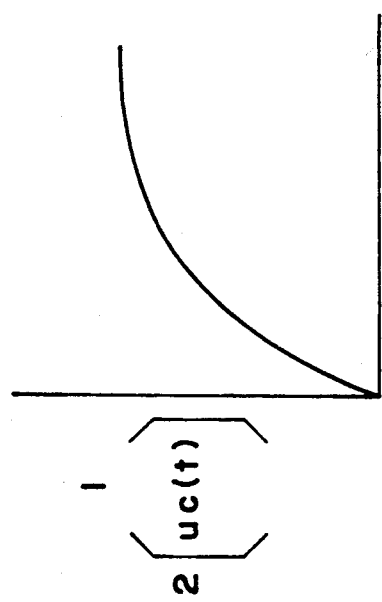
Fig.18a(1)
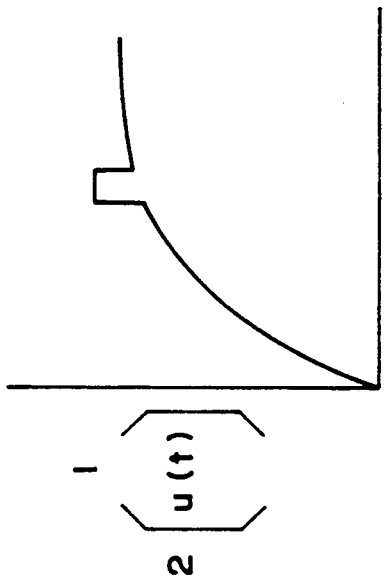
Fig.18a(3)

Fig.18b

DIFFERENTIAL EQUATION (RUNGE-KUTTA METHOD)

$$\left[\frac{d}{dt}x(t)\right] = \left[A\right] \cdot \left[x(t)\right] + \left[B\right] \cdot \left[u(t)\right]$$

$$\left[ya(t)\right] = \left[c\right] \cdot \left[x(t)\right]$$

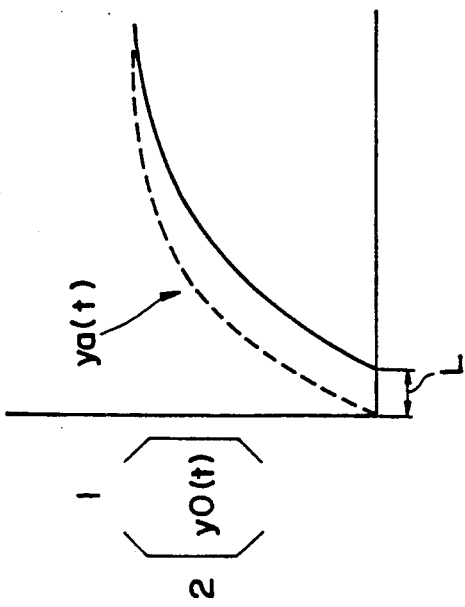
Fig.18c(2)
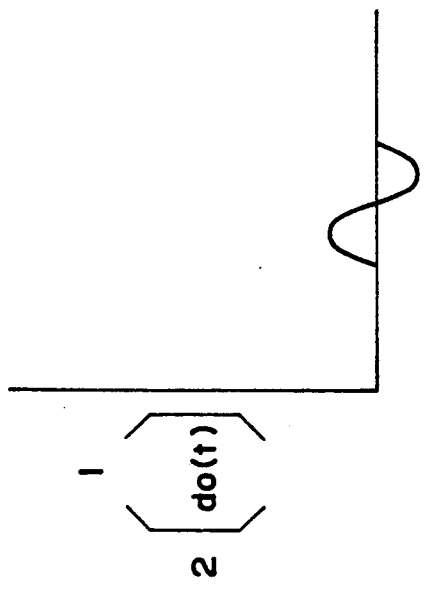
Fig.18c(1)
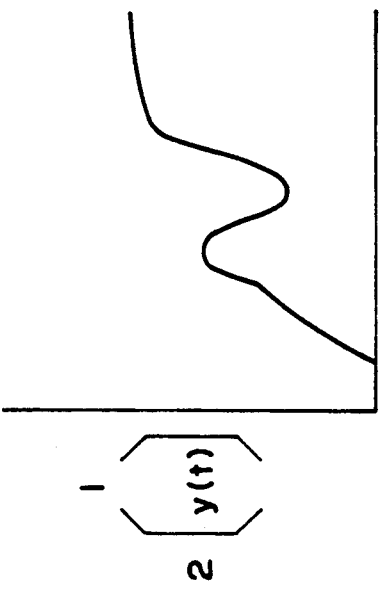
Fig.18c(3)

FIG. 23

FUZZY SIMULATOR

| UTILITY | FILE | KNOWLEDGE | SIMULATION | HARDCOPY | END |

CONTROL SYSTEM SIMULATION

CONTROL OBJECTIVE SYSTEM DEGREE A(MAX5) : 5   INPUT DEGREE B(MAX2) : 2   OUTPUT DEGREE C(MAX2) : 2

CONTROL OBJECTIVE MODEL

SUBMENU
EXECUTE
CANCEL

◁  1∖1  ▷

A :

B :

C :

IDLE TIME   OUTPUT 1 SIDE :                                    OUTPUT 2 SIDE :

EXIT

NEW CONTROL OBJECTIVE MODEL TO BE SET? SELECT SUBMENU BY RIGHT BUTTON OF MOUSE.

FIG. 24

FUZZY SIMULATOR

| UTILITY | FILE | KNOWLEDGE | SIMULATION | HARDCOPY | END |

CONTROL SYSTEM SIMULATION

CONTROL OBJECTIVE SYSTEM DEGREE : 5   INPUT DEGREE : 2   OUTPUT DEGREE : 2
ITERATION COUNT :

SIMULATION ENVIRONMENTAL CONDITIONS

SIMULATION PERIOD OF TIME -           STEP OF TIME -

TARGET VALUE : FORMAT (1: STEP 2:LUMP) -
               MAGNITUDE(GRADIENT)1 -           MAGNITUDE(GRADIENT)2 -

EXTERNAL DISTURBANCE  NY (1: YES  2: NO) -
                      FORMAT (1: STEP  2: PULSE  3: SINE WAVE) -
                                                    SINE WAVE FREQUENCY (Hz) -
                      APPLICATION POSITION (1: INPUT SIDE  2: OUTPUT SIDE) -         MAGNITUDE -
                      APPLICATION START TIME -                                       END TIME -

INITIAL STATE AMOUNT : 1 -          2 -          3 -          4 -          5 -

GAIN  : INPUT 1 -             INPUT 1 DIFFERENTIAL -             OUTPUT 1 -
        INPUT 2 -             INPUT 2 DIFFERENTIAL -             OUTPUT 2 -

OUTPUT FORMAT : OUTPUT 1(1: POSITION TYPE 2: VELOCITY TYPE) -
                OUTPUT 2(1: POSITION TYPE 2: VELOCITY TYPE) -

SUBMENU

CONTROL OBJECT SETTING REFERENCE
CONTROL OBJECTIVE FILE READING
CONDITION SETTING
CONDITION FILE READING
SIMULATION EXECUTION
SIMULATION RESULT DISPLAY
CONTROL OBJECTIVE FILE SAVING
CONDITION FILE SAVING
SIMULATION RESULT SAVING
PRINT OUTPUT

◁        1 / 1        ▷

EXIT

SELECT SUBMENU BY RIGHT BUTTON OF MOUSE. DISPLAYED ARE HERE CURRENT CONTROL OBJECTIVE MODEL AND CONDITIONS.

FUZZY SYSTEM

BACKGROUND OF THE INVENTION

1. Field of the Invention

The present invention relates to a fuzzy system, and in particular, to a membership function unit to be employed for a fuzzy inference, to a fuzzy inference apparatus executing an inference in conformity with a predetermined fuzzy processing rule, and to a support apparatus to be used in a construction of a fuzzy control system for facilitating development of the system.

2. Description of the Related Art

In accordance with the fuzzy theory, it is possible to represent senses of human beings by utilizing membership functions as means to numerically express such senses.

The human senses characteristically change depending on situations and environments of a human being. For example, let us consider a temperature of water in a Japanese bath. Since the senses vary between the seasons of the year, the judgement of an appropriate temperature suitable for the bath changes depending on each season. In general, when the outdoor or environmental temperature is higher, a slightly warmer temperature of the water is likely to be desired. Namely, the suitable temperature is assumed such that a slightly lower temperature and a slightly higher temperature are appropriate in summer and winter, respectively.

As describe above, owing to the difference in the senses with respect to the temperature of water, as shown in the graphs of FIGS. 26a to 26c, membership functions representing the appropriate temperatures of water develop different contours in association with environmental temperatures.

The graph of FIG. 26a shows a membership function developed when the environmental temperature is 20° C. in which when the temperature rises to 30° C., the graph shifts toward the direction of the lower temperature as shown in FIG. 26b, whereas when the temperature lowers to 10° C., the graph is displaced toward the direction of the higher temperature as shown in FIG. 26c.

The membership functions $\mu^{20}_A(t)$, $\mu^{20}_B(t)$, and $\mu^{20}_C(t)$ representing the senses of "lukewarm", "appropriate temperature", and "hot" at the environmental temperature 20° C. are expressed as follows.

$$\mu^{20}_A(t) = [1 \wedge \tfrac{1}{2}(t-42)] \vee 0 \quad (1)$$

$$\mu^{20}_B(t) = [\tfrac{1}{2}(t-40)\wedge -\tfrac{1}{2}(t-44)] \vee 0 \quad (2)$$

$$\mu^{20}_C(t) = [\tfrac{1}{2}(t-42)\wedge 1] \vee 0 \quad (3)$$

In these expressions (1) to (3), $\wedge$ and $\vee$ denote MIN and MAX operations, respectively.

Similarly, the membership functions at the environmental temperatures 30° C. and 10° C. are respectively represented by the following expressions (4) to (6) and (7) to (9).

$$\mu^{30}_A(t) = [1 \wedge -\tfrac{1}{2}(t-40)] \vee 0 \quad (4)$$

$$\mu^{30}_B(t) = [\tfrac{1}{2}(t-38)\wedge -\tfrac{1}{2}(t-42)] \vee 0 \quad (5)$$

$$\mu^{30}_C(t) = [\tfrac{1}{2}(t-40)\wedge 1] \vee 0 \quad (6)$$

$$\mu^{10}_A(t) = [1 \wedge -\tfrac{1}{2}(t-44)] \vee 0 \quad (7)$$

$$\mu^{10}_B(t) = [\tfrac{1}{2}(t-42)\wedge -\tfrac{1}{2}(t-46)] \vee 0 \quad (8)$$

$$\mu^{10}_C(t) = [\tfrac{1}{2}(t-44)\wedge 1] \vee 0 \quad (9)$$

In the conventional fuzzy system, a plurality of membership functions are required to be defined for the respective environmental temperatures in advance. If it is desired to establish correspondences with respect to all possible environmental temperatures, an infinite number of membership functions are required to be defined.

In order to cope with the variation in the sense above, there has been proposed a method in which the environmental temperature is assumed to be an element or a factor (an external disturbance) increasing ambiguity of the sense so as to adopt a membership function (as shown in FIG. 27) obtained through a composition utilizing a plurality of membership functions.

The graph of FIG. 27 shows membership functions developed when the environmental temperature deviates in a range from 10° C. to 30° C. centered on 20° C. The membership function representing the appropriate temperature extends in the water temperature range from 38° C. to 46° C. When the width of the range is narrower, the ambiguity of the membership function expressing the suitable temperature is decreased. However, in the method associated with this graph, and membership function possesses an enlarged width, namely, an increased ambiguity, which leads to a problem that an appropriate inference cannot be easily accomplished.

Incidentally, in general, according to fuzzy control, when an input signal is supplied, for example, form a sensor to a fuzzy inference apparatus, a group of fuzzy inference rules are used to achieve an inference operation such that based on a result of the inference operation of each inference rule, the apparatus decides a control operation of a control object. The fuzzy inference apparatus includes a fuzzy inference antecedent processing section and a fuzzy inference consequent processing section, so that the inference outputs of the respective inference rules are fed from the component section to a concluding or composing section, which achieves a composition by use of the inference outputs. For example, the output of a definite or determinant value is generated so as to be delivered to the control object.

In the control system of this kind, there may occur a case where an abnormality signal is received from a sensor or the like or where a decrease in a signal level lowers the reliability of the input signal from the sensor. In such a situation, it is not appropriate to directly supply the control object with the determinant value output as the final output from the fuzzy inference apparatus. Consequenty, as shown in FIG. 28, a final decision section 92 is disposed on the output side of a fuzzy inference apparatus 91 so as to determine presence or absence of an exception signal such as an abnormality signal such that depending on the result of determination, the determinant output from the fuzzy inference apparatus 91 is delivered as the final output or an abnormality output is produced.

However, in such a method, there is required the final decision section 92, which necessitates excessive circuit configurations and devices and hence soars the cost of the apparatus.

In order to cope with the problem above, there has been employed a fuzzy inference apparatus 93 (shown in FIG. 29) in which the inference rules include propositions or statements related to exception signals. In this method, however, the exception signals are required to be incorporated as propositions of the inference rules, which leads to a problem that the inference rules become complicated.

Furthermore, certainty of each inference rule can be determined by use of the membership function in the fuzzy inference antecedent and consequent processing sections. However, in a case where such certainty is desired to be altered, it is necessary to set a membership function for each inference rule, namely, the corresponding operation is troublesome.

When a fuzzy control system is to be configured for a control system, it is necessary to produce an application system including fuzzy inference rules and membership functions most suitable for the control system. In a case of development of an application system to conduct the fuzzy control by use of a microprocessor and storage, data items of fuzzy inference rules and membership functions as well as fuzzy inference programs have been conventionally developed for each application.

However, because of necessities of development of the data items of fuzzy inference rules and membership functions and fuzzy inference programs for each application, the development efficiency is considerably lowered. Moreover, an evaluation of the fuzzy inference rules and the membership functions of the application thus developed cannot be accomplished without connecting the system to the actual control system. In consequence, the system development requires a very long period of time.

SUMMARY OF THE INVENTION

It is therefore an object the present invention to provide a novel membership function unit in which membership functions are adjusted depending on elements influencing human senses so as to achieve an appropriate inference without necessitating many membership functions to be prepared.

Another object of the present invention is to provide a novel membership generator in which a weighting operation is conducted on an inference result to correct an inference output so as to cope with an abnormality signal or the like without causing the circuit configuration and inference rules to be complicated.

Furthermore, still another object of the present invention is to provide a support apparatus which considerably improves the development efficiency of a fuzzy control system, thereby solving the difficulties above.

In accordance with the present invention, the membership function unit comprises a membership function setting section for adjusting positions or shapes of membership functions depending on inputs of elements influencing human senses so as to set the membership functions and a membership value computing section for computing membership function values associated with input variables in the membership functions attained by the membership function setting section.

Moreover, according to the present invention, in order to correctly adjust membership functions even when the elements influencing the human senses are complicatedly linked with each other, the membership function setting section includes a fuzzy inference section which receives as inputs thereto the elements influencing the human senses to achieve a fuzzy inference so as to decide the positions or shapes of the membership functions.

After the membership functions of which positions and shapes are adjusted depending on the elements influencing the human senses are thus set, arithmetic operations are conducted on input variables by use of the membership functions to compute the membership function values. In consequence, without preparing definitions of many membership functions in advance, an appropriate inference can be carried out.

In addition, by adjusting the membership functions in accordance with a fuzzy inference, it is possible to appropriately accomplish the function adjustment even when the elements influencing the human senses are complexly associated with each other.

The fuzzy inference apparatus according to the present invention comprises means for conducting an inference operation for each inference rule, means for setting for each inference rule absolute weight coefficients unique thereto and relative weight coefficients between the inference rules, and means for correcting an inference output by use of the absolute and relative weight coefficients.

The inference output is corrected by use of relative weight coefficients in association with an abnormality signal occurrence and the like and is further corrected by use of absolute weight coefficients depending on the certainty of the inference rules or the like. In consequence, the exception processing, such as processing to be conducted at an abnormality occurrence, can be carried out without causing the circuit configuration and inference rules to be complicated. Furthermore, the certainty of the inference rules and the like can be easily reflected onto the inference output.

Moreover, the fuzzy control system development support apparatus according to the present invention is characterized by a knowledge base for storing therein fuzzy processing rules and membership functions respectively edited on a display screen and a simulation section for achieving a desired inference simulation based on the knowledge base.

In the apparatus above, the simulation section includes a simple control simulation section which supplies a single pseudo input or consecutive pseudo inputs to the knowledge base to achieve a fuzzy inference so as to produce an inference result.

Furthermore, the simulation section of the apparatus above is characterized by a control system simulation section for accomplishing a simulation in a closed loop control system including a control objective model established with arbitrary parameters and the fuzzy inference section so as to generate a simulation result.

In the apparatus above, it is favorable to include means for continuously outputting simulation results as fuzzy rule adaptive degrees.

Moreover, the fuzzy control system development support apparatus according to the present invention is characterized by comprising a knowledge base for storing therein fuzzy processing rules and membership functions edited on a display screen, and a translator for translating the contents of the knowledge base into any language.

In accordance with the present invention, since a support apparatus includes a knowledge base and a simulation section so as to set the contents of the knowledge base on a display screen, the inference simulation can be easily carried out and the alteration of the knowledge base is also considerably simplified. With the provision of the support apparatus configured as described above, there is completely removed the difficulty of the prior art technology that the evaluation of the fuzzy processing rules and the membership functions cannot be accomplished without connecting the application system to the actual machine. Namely, the evalution thereof can be conducted at a development stage by use of the support apparatus. Consequently, there is attained an advantage that a desired application can be developed in a very short period of time.

Furthermore, in accordance with the present invention, since an inference result can be produced for consecutive pseudo inputs so as to be stored in a memory, it is possible to employ the memory directly in an actual fuzzy controller. This provision leads to an advantage that the inference program development is unnecessary.

Moreover, according to the present invention, in a support apparatus, a closed loop control system is constituted with a control objective model and a fuzzy inference section so as to achieve a simulation and the control objective model and the knowledge base of the fuzzy inference section can be easily edited on the display screen. As a result, the simulation is considerably facilitated and hence the support capability for the development is highly enhanced.

In addition, according to the present invention, there is disposed a translator for translating the contents of the knowledge base into an arbitrary language such as the C language; consequently, the fuzzy system is quite advantageous for the development of applications programs conforming to various kinds of microprocessors.

Furthermore, in accordance with the present invention, since the simulation results can be displayed as fuzzy rule adaptive degrees, the evaluation of the fuzzy processing rules are advantageously simplified to a considerable extent.

BRIEF DESCRIPTION OF THE DRAWINGS

These and other objects and advantages of the present invention will become apparent by reference to the following description and accompanying drawings wherein:

FIGS. 14 to 16 are diagrams schematically showing examples of display screens when a fuzzy processing rule and a membership function are edited;

FIG. 17 is a schematic diagram showing formulae representing a plant model;

FIGS. 18a(1), 18a(2), 18a(3), 18b, 18c(1), 18c(2) and 18c(3) are diagrams schematically showing flow of computations in a plant computing section;

FIGS. 23 and 24 are diagrams respectively showing screens in which a control objective model and a control simulation environmental condition are set;

DESCRIPTION OF THE PREFERRED EMBODIMENTS

Figure 1:
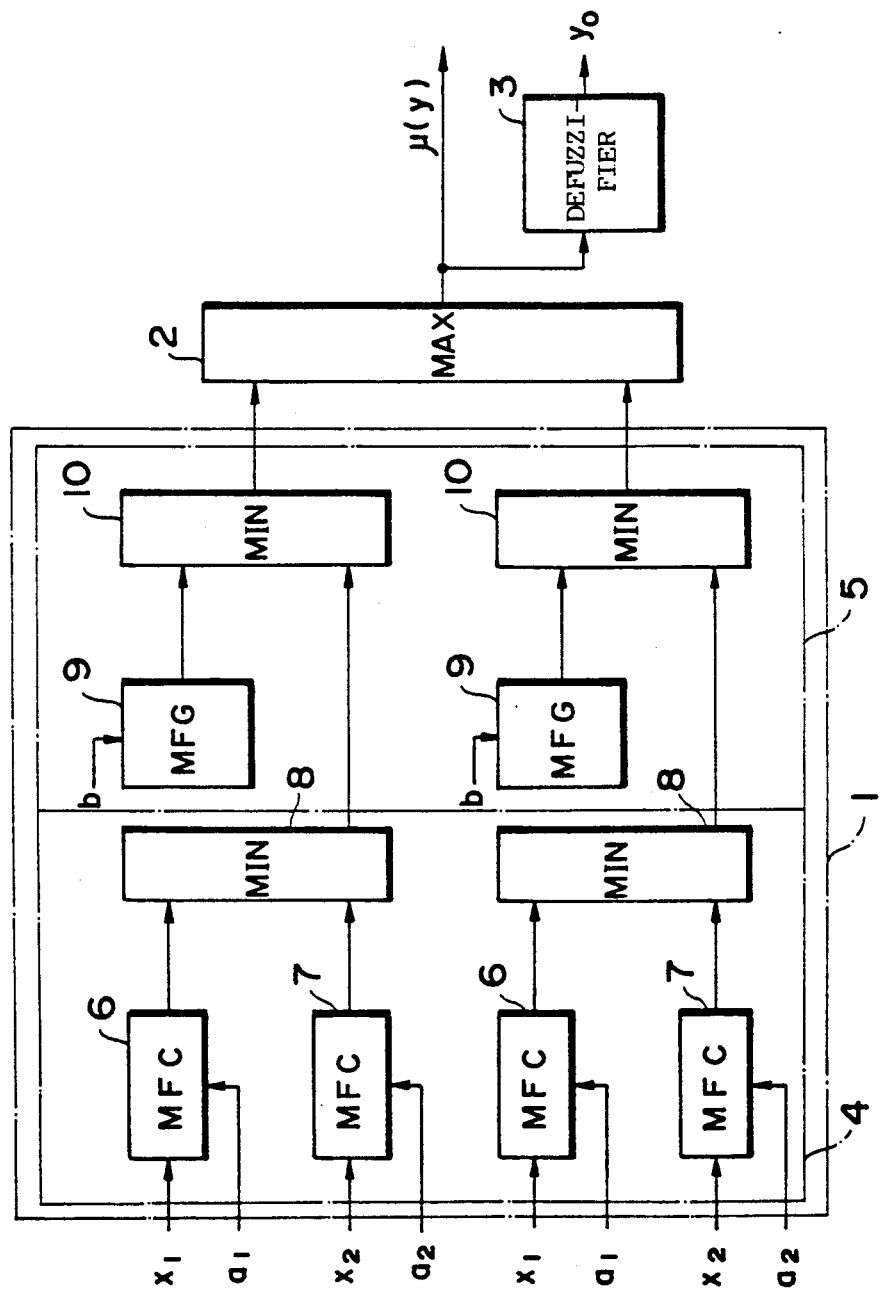
FIG. 1 is a schematic block diagram showing a configuration example of a fuzzy inference section to which the present invention is applied.

FIG. 1 is a diagram showing an example of the constitution of a fuzzy inference apparatus to which the present invention is applied.

The fuzzy inference apparatus is disposed, for example, to automatically control the temperature of water in a bath. However, the present invention is not restricted by this example, namely, is also naturally applicable to fuzzy inference systems associated with other purposes.

In this illustrative example, the fuzzy inference apparatus comprises a rule processing section 1, an MAX composing circuit 2, and a defuzzifier 3. The rule processing section 1 is supplied with two kinds of inputs $x_1$ and $x_2$ obtained by conducting sample and hold operations on signals from sensors or the like. The number of inputs is not necessarily limited to two. The number may be one or may be three or more.

The rule processing section 1 includes an antecedent processing section 4 and a consequent processing section 5 for executing a fuzzy inference in conformity with a plurality of fuzzy processing rules. The antecedent processing section 4 comprises for each rule two membership function circuit (MFC) 6 and 7 and an MIN circuit 8. The consequent processing section 5 comprises for each rule a membership function generator (MFG) 9 and an MIN circuit 10.

The fuzzy processing rules are called "if, then" rules and are represented in this embodiment as follows:

(Rule 1)

if $x_1 = X_{11}^{(a1)}$ and $X_2 =_{11}^{(a2)}$,
then $y = Y_1^{(b)}$
(Rule 2)
if $x_1 = X_{21}^{(a1)}$ and $X_2 =_{22}^{(a2)}$,
then $y = Y_2^{(b)}$.

Figure 2:
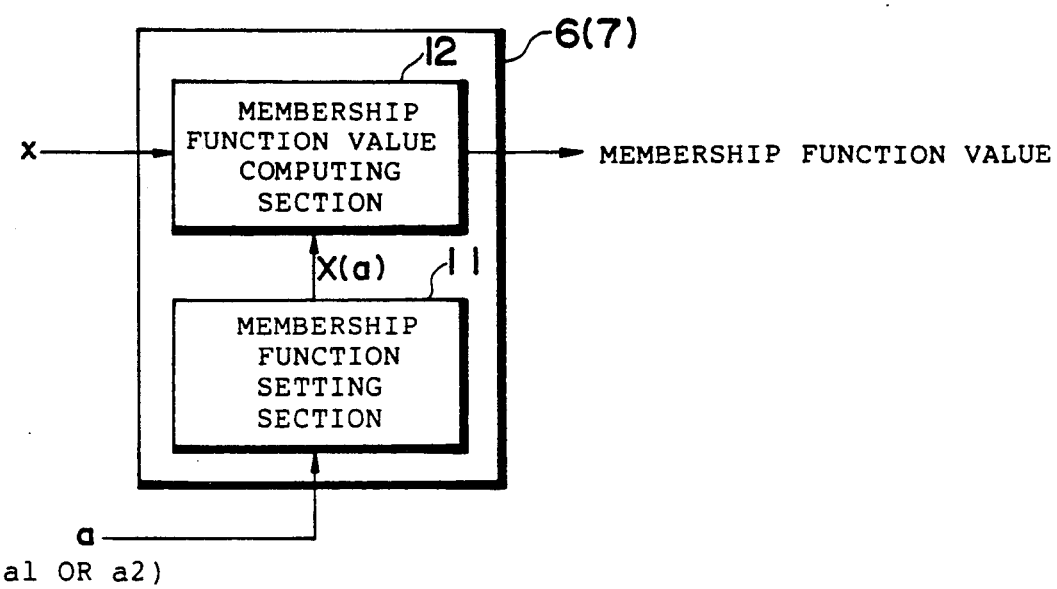
FIG. 2 is a block diagram schematically showing the configuration of a membership function unit associated with a first embodiment according to the present invention.

FIG. 2 shows an example (a first embodiment) of the constitution of the membership function circuit 6 or 7 in the antecedent processing section 4. This configuration includes a membership function setting section 11 and a membership function value computing section 12.

The membership function setting section 11 is adopted to adjust positions or shapes of membership functions for the setting thereof depending on elements (e.g. the environmental temperature in the example described above) influencing human senses. In this configuration, depending on elements a1 and a2, positions or shapes of membership functions are set to the first and second membership function circuits 6 and 7, respectively. The elements a1 and a2 are supplied as inputs to set membership functions from a sensor (e.g. a temperature sensor); however, these inputs may be delivered from other than sensors (for example, a keyboard, a file, or the like may be used). Furthermore, although the respective elements are represented as scalar quantities, these elements may be expressed in vector quantities.

In the constitution example above, assuming a case where the position of a membership function varies depending on an environmental temperature $\tau$, the senses of "lukewarm", "appropriate temperature", and "hot" are respectively expressed by the following membership functions.

$$\mu_A(t,\tau) = [1 \wedge \tfrac{1}{2}(t-42-f_1(\tau)] \vee 0 \quad (10)$$

$$\mu_B(t,\tau) = [\tfrac{1}{2}(t-40-f_{21}(\tau)) \wedge -\tfrac{1}{2}(t-44-f_{22}(\tau))] \vee 0 \quad (11)$$

$$\mu_C(t,\tau) = [\tfrac{1}{2}(t-42-f_3(\tau)) \wedge 1] \vee 0 \quad (12)$$

The function f above represents variations in the positions of the membership functions depending on a change in the environmental temperature $\tau$. Assuming here $f_1(\tau) = f_{21}(\tau) = f_{22}(\tau) = f_3(\tau) = 1/5(\tau - 20)$, the expression (11) above is identical to the expressions (2), (5), and (8).

Figure 4:
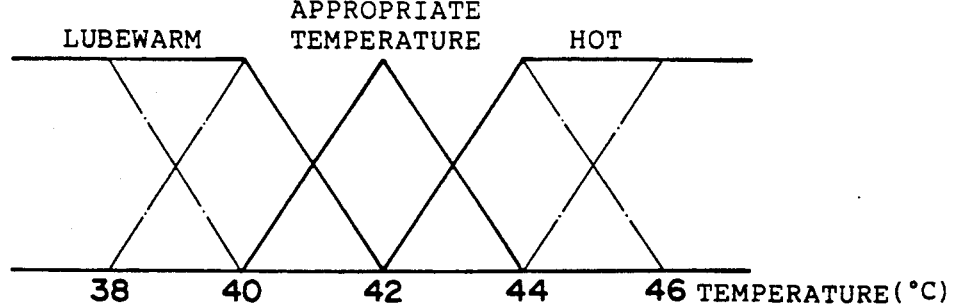
FIG. 4 is a graph showing a state in which the shape of the membership function changes.

FIG. 4 shows the membership functions thus obtained in which broken lines indicate a state of change in the position of the membership functions.

Furthermore, assuming a case where the shape (gradient) of a membership function alters depending on the environmental temperature $\tau$, the membership functions above are expressed as follows:

$$\mu_A(t,\tau) = [1 \wedge -g_1(\tau)(t-f_1(\tau))] \vee 0 \quad (13)$$

$$\mu_B(t,\tau) = [g_{21}(\tau)(t-f_{21}(\tau)) \wedge -g_{22}(\tau)(t-f_{22}(\tau))] \vee 0 \quad (14)$$

$$\mu_C(t,\tau) = [g_3(\tau)(t-f_3(\tau)) \wedge 1] \vee 0 \quad (15)$$

In these expressions, assuming
$g_1(\tau) = g_{21}(\tau) = g_{22}(\tau) = g_3(\tau)$,
$f_1(\tau) = f_3(\tau) = 42 + 1/5(\tau - 20)$, and
$f_{21}(\tau) = 40 + 1/5(\tau - 20)$; the expression (14) is identical to the expressions (2), (5), and (8).

Figure 5:
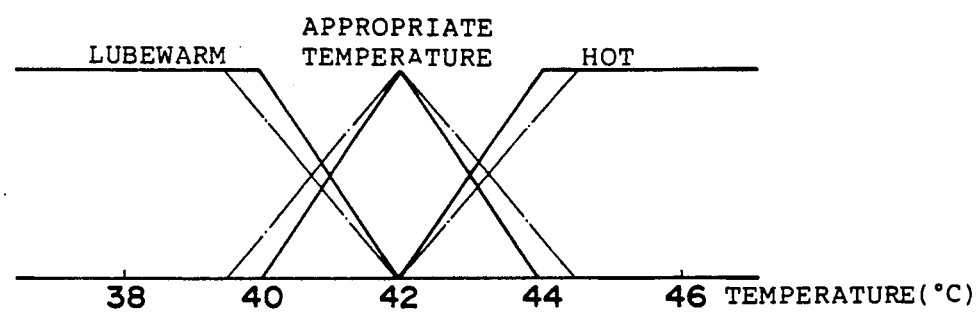
FIG. 5 is a graph showing a state in which the gradient of the membership function varies.

FIG. 5 shows membership functions thus drawn in which the broken lines indicate a state of change in the gradient of the membership functions.

In the examples above, only the environmental temperature $\tau$ is assumed as the element or factor to influence the human senses. However, assuming two kinds of elements (e.g. an environmental temperature $\tau$ and an environmental humidity $\sigma$) in this case, the membership functions are expressed as follows:

$$\mu_A[t,(\tau,\sigma)] = \{1 \wedge g_1(\tau,\sigma)[t-f_1(\tau,\sigma)]\} \vee 0 \quad (16)$$

$$\mu_B[t,(\tau,\sigma)] = \{g_{21}(\tau,\sigma)[t-f_{21}(\tau,\sigma)]\} \wedge -g_{22}(\tau,\sigma)[t-f_{22}(\tau,\sigma)] \vee 0 \quad (17)$$

$$\mu_C[t,(\tau,\sigma)] = \{g_3(\tau,\sigma)[t-f_3(\tau,\sigma)] \wedge 1\} \vee 0 \quad (15)$$

Figure 3:
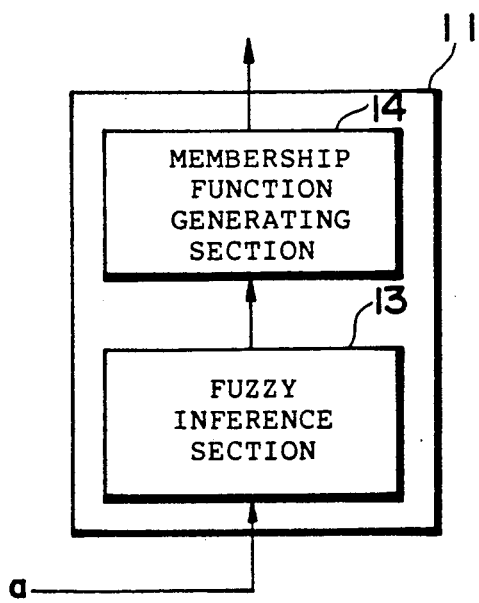
FIG. 3 is a block diagram showing a second embodiment of the membership function setting section.

FIG. 3 shows a second embodiment according to the present invention in which the membership function setting section 11 includes a fuzzy inference section 13 and a membership function generating section 14.

Influences of the variations in the environmental temperature $\tau$ and humidity $\sigma$ on the positions and gradient values of the memberships are represented by use of the functions f and g. However, when the elements influencing the human senses are complexly linked with each other, it is difficult to attain parameters expressed by such functions f and g. In order to overcome this difficulty, according to the second embodiment, the fuzzy inference section 13 conducts a fuzzy inference to obtain the parameters above so as to generate the membership functions by use of the parameters in the membership function generating section 14.

Fuzzy processing rules in the fuzzy inference section 13 are represented as follows in the case where, for example, only the environmental temperature is set as the factor influencing the human senses.

(Rule 1)
If the environmental temperature indicates a hot condition, human senses are likely to desire slightly warm water.

(Rule 2)
If the environmental temperature indicates a warm condition, human senses are likely to desire water at a usual or ordinary temperature.

(Rule 3)
If the environmental temperature indicates a hot condition, human sense are likely to desire a slightly hot water.

Figure 6A:
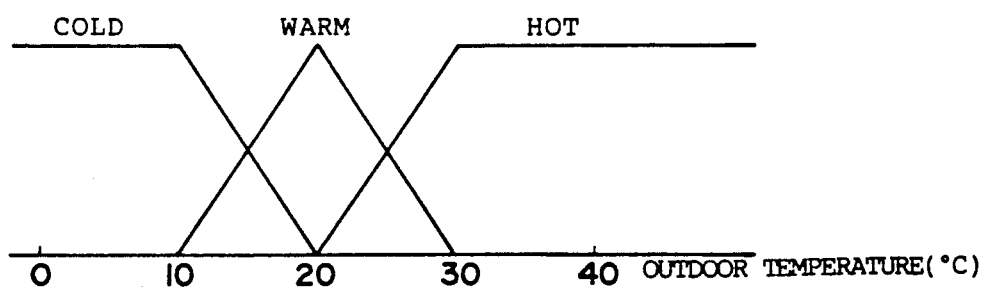
FIGS. 6a and 6b are explanatory diagrams for explaining membership functions employed in an inference process of the second embodiment.
Figure 6B:
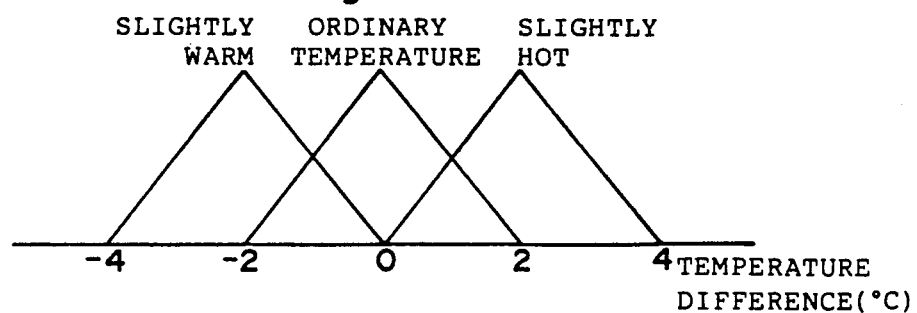

FIGS. 6a and 6b specifically show the membership functions under the conditions above.

The membership functions thus determined are fed to the membership function value comprising sections 12 of the membership function circuits 6 and 7. On receiving an input x, the membership function value computing section 12 conducts an operation to attain an adaptive degree indicating a degree of adaptability of the input x onto the membership function so as to compute a membership function value.

Returning to FIG. 1, in the antecedent processing section 4 of the rule processing section 1, when the membership function circuits 6 and 7 respectively compute, for each rule, membership function values (adaptive degrees) by use of membership functions respectively adjusted depending on the elements a1 and a2, the respective MIN circuits 8 select smaller ones of the computed values. In the MIN circuit 10 of the consequent processing sections based on the selected adaptive degree, there is imposed a restriction on the membership function related to an output y of the fuzzy rule and fed by the membership function generator 9, thereby attaining, for example, a membership function of a trapezoidal shape.

The membership function associated with the output y to be supplied to each MIN circuit 10 is, like in the foregoing case, beforehand adjusted in its position or shape depending on the element b influencing the human senses in the membership function generator 9.

The MAX composing circuit 2 superimposes the outputs from the MIN circuits 10 to create a composition output $\mu(y)$. The defuzzifier 3 computes the center of gravity of the composition output so as to attain a definite or determinant output $y_0$.

Figure 7:
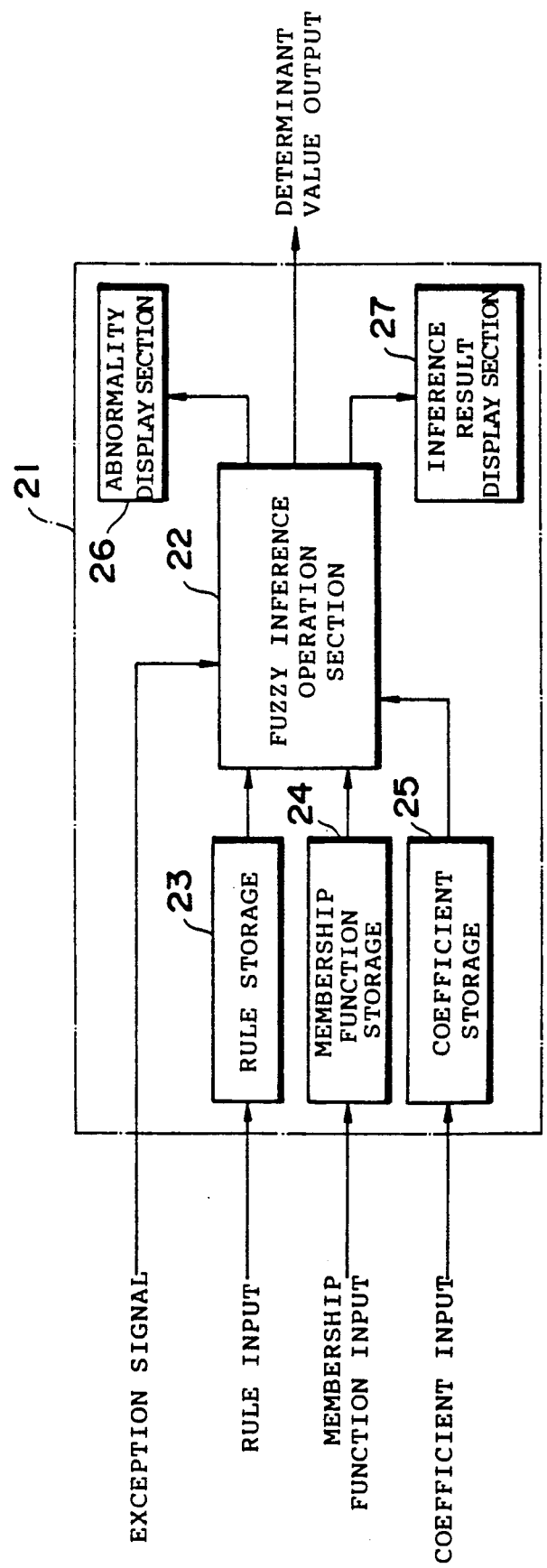
FIG. 7 is a block diagram showing a fuzzy inference apparatus associated with a third embodiment in accordance with the present invention.

FIG. 7 shows the configuration of a fuzzy inference apparatus 21 associated with a third embodiment in accordance with the present invention. This configuration includes, centered on a fuzzy inference operation section 22, a rule storage 23, a membership function storage 24, a coefficient storage 25, an abnormality display section 26, and an inference result display section 27.

Figures 8, 9:
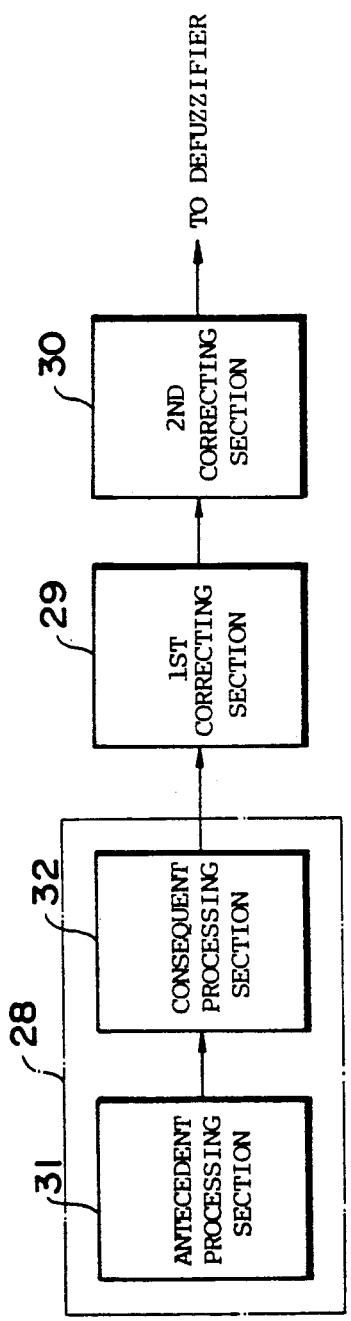
FIG. 8 is a functional block diagram showing a fuzzy inference operation unit.
FIG. 9 is an explanatory diagram useful to explain an example of contents stored in a coefficient memory.

The fuzzy inference operation section 22 comprises, as shown in the functional block diagram of FIG. 8, a rule processing section 28 and first and second correction sections 29 and 30. Correction outputs from the second correction sections are processed to generate a composition output to be supplied to a defuzzifier, (not shown), which computes a center of gravity of the composition output, thereby delivering a determinant value output to a control object.

The rule processing section 28 represents a portion of the inference apparatus in which a fuzzy inference is achieved in conformity with a plurality of inference processing rules by use of the antecedent processing section 31 and the consequent processing section 32. The antecedent processing section 31 is supplied with an input signal from a sensor or the like.

The inference rules are called "if,then" rules and are expressed in this case of the embodiment as follows.

(Rule 1)
If an abnormality signal is received from a sensor A, an abnormality output is produced.

(Rule 2)
If a signal level of a sensor B is lowered, a degree of abnormality of the sensor B is slightly great.

(Rule 3)
If the signal level of the sensor A is large and that of the sensor B is small, the signal level of an output signal F is slightly increased.

(Rule 4)
If the signal level of the sensor A is small and that of a sensor C is intermediate, the signal level of the output signal F is considerably increased.

All inference rules are stored in the rule storage 23, shown in FIG. 7, whereas the membership functions to be employed for the respective inference rules are loaded in the membership function storage 24.

The coefficient storage 25 is disposed to store therein absolute weight coefficients unique to the respective rules to be set to the associated inference rules and relative weight coefficients between the rules. FIG. 9 shows an example of the contents of the storage 25.

In accordance with the values of FIG. 9, for a rule 1, the absolute weight coefficient is set as 1.0; furthermore, for rules 3 and 4 related to the rule 1, zero is set as the relative weight coefficient. In consequence, when rule 1 is effected, the inference outputs attained by use of rules 3 and 4 are set to zero.

For a rule 2, the absolute weight coefficient is set as 1.0, and for the rule 3 associated with rule 2, the relative weight coefficient is set as 0.5. As a result, when rule 2 is executed, the inference output associated with rule 3 is multiplied by the relative coefficient 0.5 so as to accomplish a correction on the inference output.

For rules 3 and 4, the absolute weight coefficients are respectively set as 1.0 and 0.5. This means that the certainty of the rule 3 is great and that of rule 4 is small. In consequence, the inference output attained by use of rule 3 is directly outputted; however, the inference output associated with rule 4 is multiplied by the relative coefficient 0.5 for a correction of the inference output.

In the configuration of FIG. 7, the inference result display section 27 is employed to display the final inference result attained by the fuzzy inference operation section 22, whereas the abnormality display section 26 displays a message indicating an abnormality occurrence.

Figure 10:
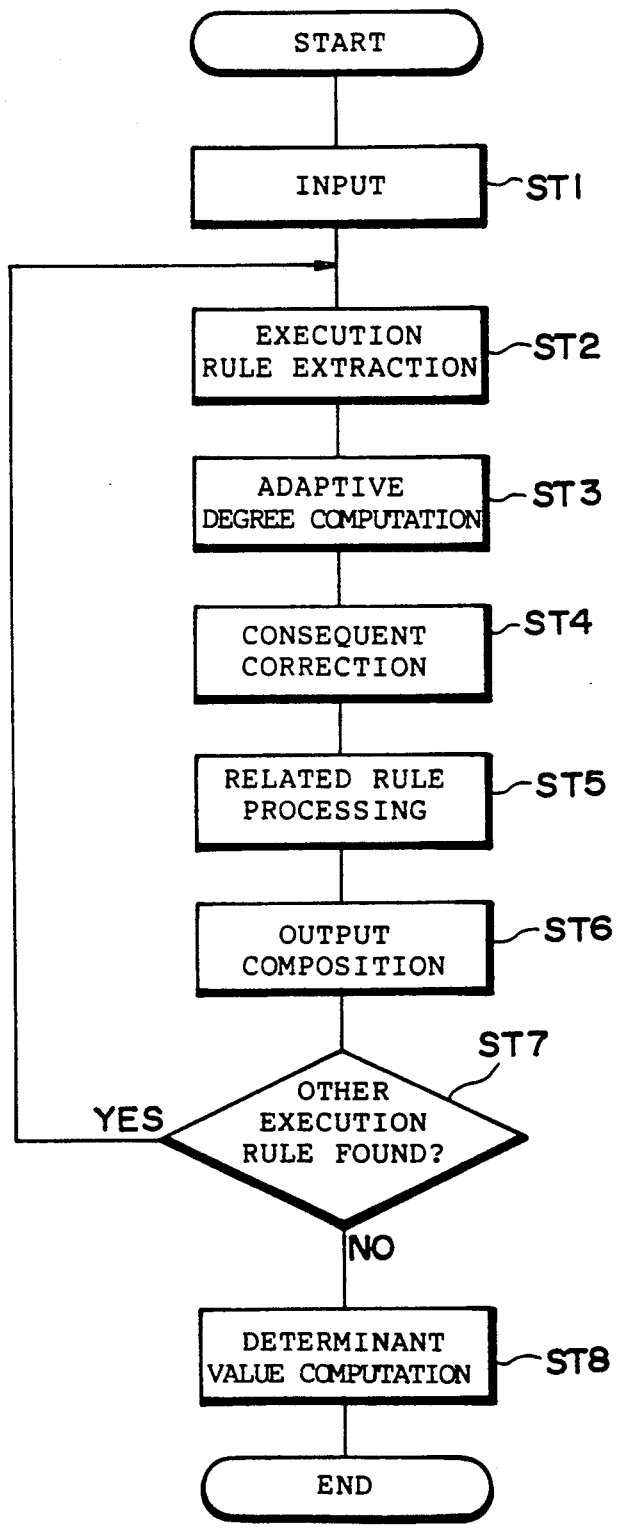
FIG. 10 is a flowchart showing a the procedure of an inference operation in a fuzzy inference operation section.

FIG. 10 shows a the flow chart of operations performed by the fuzzy inference operation section 22.

In this flowchart, first, when an input signal is received from a sensor in a step 1 (ST1), a step ST2 then extracts an inference rule to be executed such that a step ST3 then effects the extracted inference processing rule by means of the antecedent processing section 31. As a result, there are computed adaptive degrees (grades or membership function values) of the respective membership functions associated with the inference rule, thereby selecting the smallest one therefrom. Next, in a step ST4, based on the adaptive degree thus selected, the consequent processing section 32 imposes a restriction onto a membership function related to an output of the inference rule so as to produce an inference output. In the first correction section 29, an absolute weight coefficient is multiplied by the inference output to accomplish the first correction of the output.

Assuming that the inference rule associated with rule 3 is executed, since the inference rule possesses a high certainty, the output is multiplied by 1.0 as the absolute weight coefficient. If inference rule of the rule 4 is to be adopted in this execution, the inference rule having a low certainty, 0.5, is used as the absolute weight coefficient for the correction of the inference output.

Figure 11:
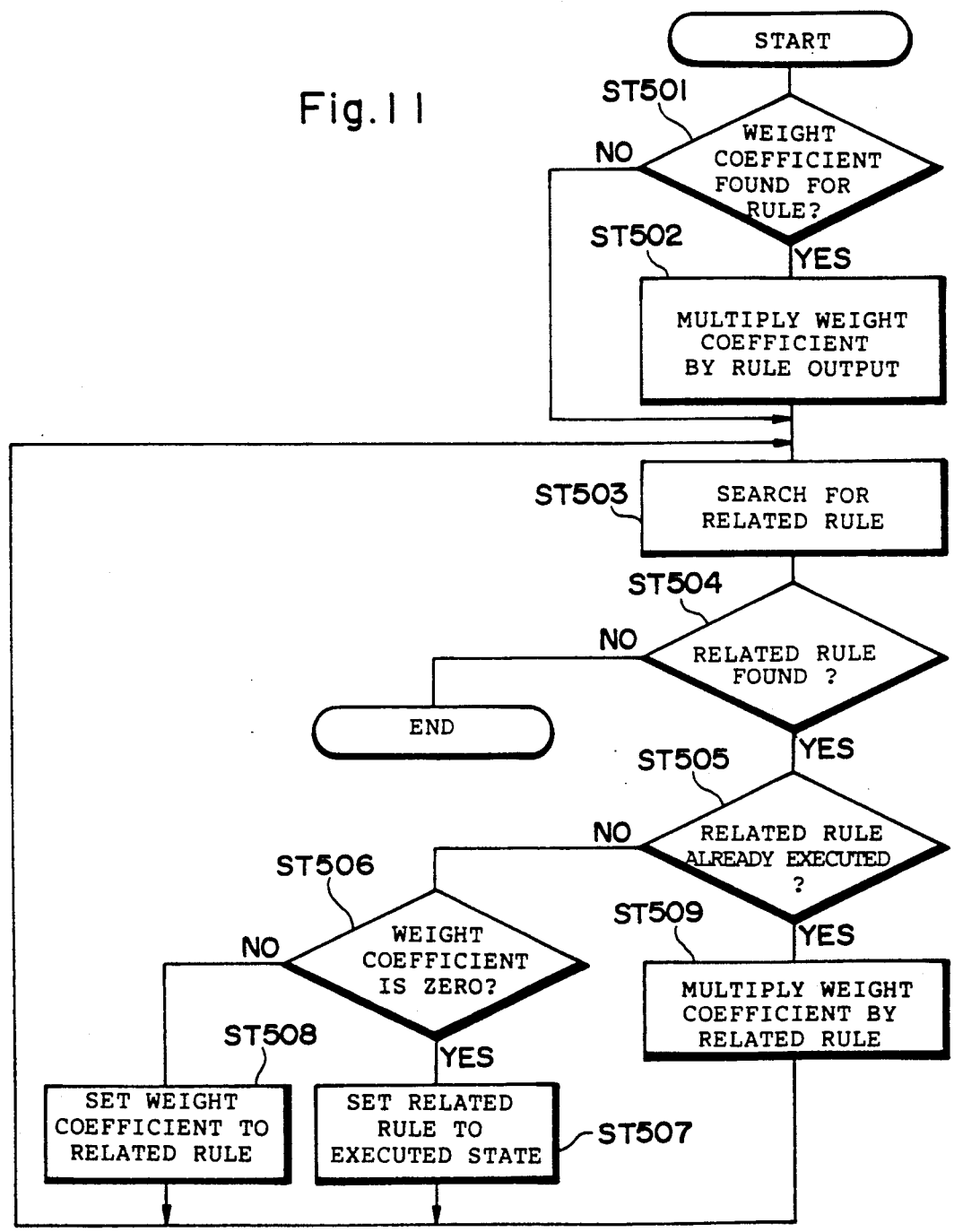
FIG. 11 is a flowchart showing a procedure of a related rule processing.

Next, in step ST5, the related rule processing of FIG. 11 is achieved: namely, in the second correction section 30, the output from the first correction section 29 is multiplied by the relative weight coefficient to conduct the second correction. The corrected inference output is subjected to a composition in an MAX composing circuit section, not shown (step 6).

When the substantially same procedure is completely achieved for all inference rules as described above, the judgement step ST7 results in "NO" so as to proceed with control to step ST8. ST8 conducts an operation to compute a center of gravity on the corrected outputs so as to create a determinant value output.

Subsequently, a description will be given of the related rule processing shown in FIG. 11.

Assuming now that an abnormality signal is inputted from the sensor A so as to first execute the inference rule of the rule 1, a step ST501 checks to determine whether or not a relative weight coefficient to be multiplied by the rule 1 is beforehand set to a predetermined buffer. Since the judgement results in "NO" in this situation, control proceeds to step ST503, which references the content of the coefficient storage 25 to determine whether or not the execution rule (rule 1) has a related rule. Since the rule 3 is found to be the related rule in the coefficient storage 25, the judgement result of step ST504 is "YES". Control thereby proceeds to step ST505 to determine whether or not the related rule has already been executed. Since the rule 3 has not been effected yet, the step ST505 produces "NO" as a result of its execution. The next step ST506 determines whether or not the relative weight coefficient associated with the related rule is zero. Since this is the case, the judgement at step ST506 results in "YES". Control then changes to step ST507, which assumes that the inference rule of the rule 3 has already been achieved and hence sets the inference output thereof to zero. In this manner, when an inference rule not having been executed is assumed in the processing as a rule already executed, the inference processing can be conducted at a higher speed.

Furthermore, since there also exists a rule 4 which is the related rule to the execution rule 1, the processing is similarly achieved, as described above. Then, after the steps subsequent to the step ST503 are executed, the judgement of the step ST504 finally results in "NO", thereby completing the procedure of the related rule processing.

Next, assuming a case where the signal level of the signal from the sensor B is decreased so as to first execute the inference rule associated with the rule 2, the step ST501 checks to determine whether or not a relative weight coefficient to be multiplied by the rule 2 is beforehand set to a predetermined buffer. Since the judgement results in "NO" in this case, control proceeds to the step ST503, which references the contents of the coefficient storage 25 to determine whether or not the execution rule (rule 2) has a related rule. Since there exists the rule 3 as the related rule, the judgement of the step ST504 results in "YES" and control proceeds to a step ST505 to determine whether or not the related rule has already been executed. Since the rule 3 has not been effected yet, the step ST505 results in "NO", and then the next step ST506 determines whether or not the relative weight coefficient associated with the related rule is zero. The relative weight coefficient with respect to the rule 3 is 0.5 in this case and hence the judgement of the step ST506 results in "NO" causing it to execute a step 508, which sets the relative weight coefficient 0.5 to the predetermined buffer with respect to the rule 3.

Since there does not exit other related rules to this rule 2, the processing is returned to the step ST503 such that the step ST504 results in "NO", thereby completing the procedure of the related rule processing.

Moreover, assuming that the inference rule of rule 3 is further executed, the step ST501 checks to determine whether or not a relative weight coefficient to be multiplied by the rule 3 is beforehand set to a predetermined buffer. Since the judgement here results in "YES" in this case, control proceeds to step ST502, which multiples the inference output of the rule 3 by the relative weight coefficient thus set to the buffer so as to correct the inference output. Subsequently, the step ST503 references the content of the coefficient storage 25 to determine whether or not the execution rule (rule 3) has a related rule. Since a related rule does not exist, the judgement at step ST504 results in "NO", thereby completing the procedure of the related rule processing.

Figure 12:
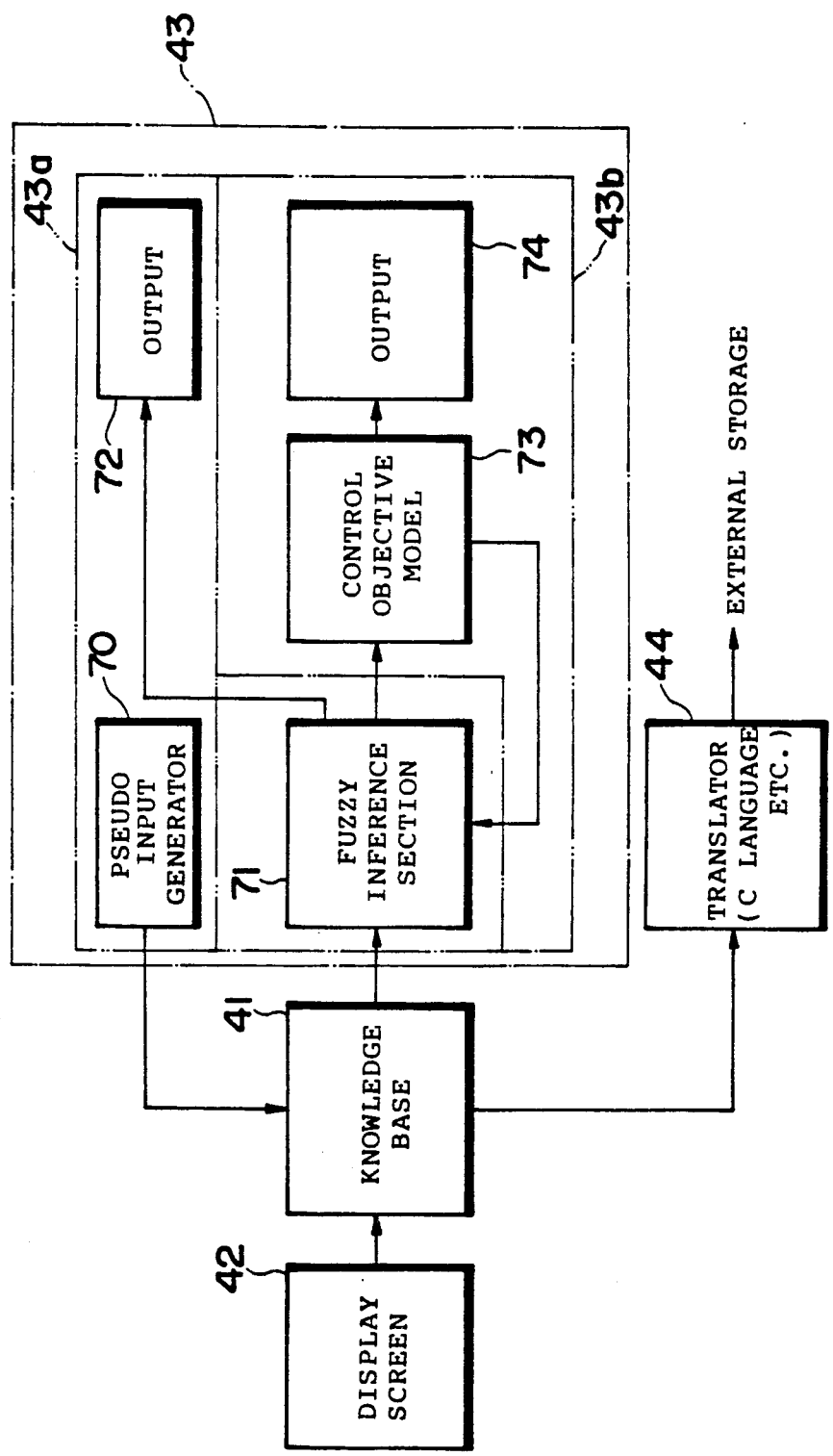
FIG. 12 is a functional block diagram showing the configuration of a fourth embodiment according to the present invention.

FIG. 12 shows the configuration of a fourth embodiment in accordance with the present invention. A knowledge base 41 is disposed to store therein fuzzy processing rules and membership functions, which are edited on a display screen 42. In the knowledge base 41, the fuzzy processing rules and the membership functions are not in the execution format and hence are converted into the execution format prior to an execution of a fuzzy inference associated therewith. A simulation section 43 is employed to achieve an inference simulation by use of the fuzzy processing rules and the membership functions stored in the knowledge base 41. In accordance with the present invention, the simulation section 43 comprises a simple inference simulation section 43a and a control system simulation section 43b. The simple inference simulation section 43a includes a pseudo input generator 70 for supplying a single pseudo input or consecutive pseudo inputs to the knowledge base 41. The simulation section 43 comprises, as its central section, a fuzzy inference section 71, which achieves a fuzzy inference on the pseudo input supplied from the pseudo input generator 70 to the knowledge base 41. For a single pseudo input or consecutive pseudo inputs, the fuzzy inference section 71 conducts a single inference or consecutive inference operations, respectively. A result of the inference is delivered as a fuzzy output and a determinant value to an output section 72, which includes a display screen and an external storage.

The control system simulation section 43b is constructed such that, by use of a closed loop, a control objective model 73 established by supplying arbitrary parameters is linked with the fuzzy inference section 71, which is then connected to an output section 74. The control objective model 73 is represented with differential equations according to, for example, the Runge-Kutta method. Results of the simulation are attained by solving the differential equations of the model 73. The obtained simulation results are delivered to the output section 74, including the display screen.

Furthermore, in accordance with the present invention, there is disposed a translator 44 for a translation into the C language and the like: namely, the fuzzy processing rules and membership functions stored in the knowledge base 41 can be translated into the C language and the like. The results of the translation are stored, for example, in an external storage.

Moreover, in accordance with the present invention, the output section 74 for outputting the simulation results attained by the control system simulation section 43b includes means for successively outputting the simulation results as fuzzy processing rule adaptive degrees to a display screen or the like. With the provision of this means, it is possible to easily evaluate the adaptive degrees and the like of the fuzzy processing rules on the display screen or the like.

Figure 13:
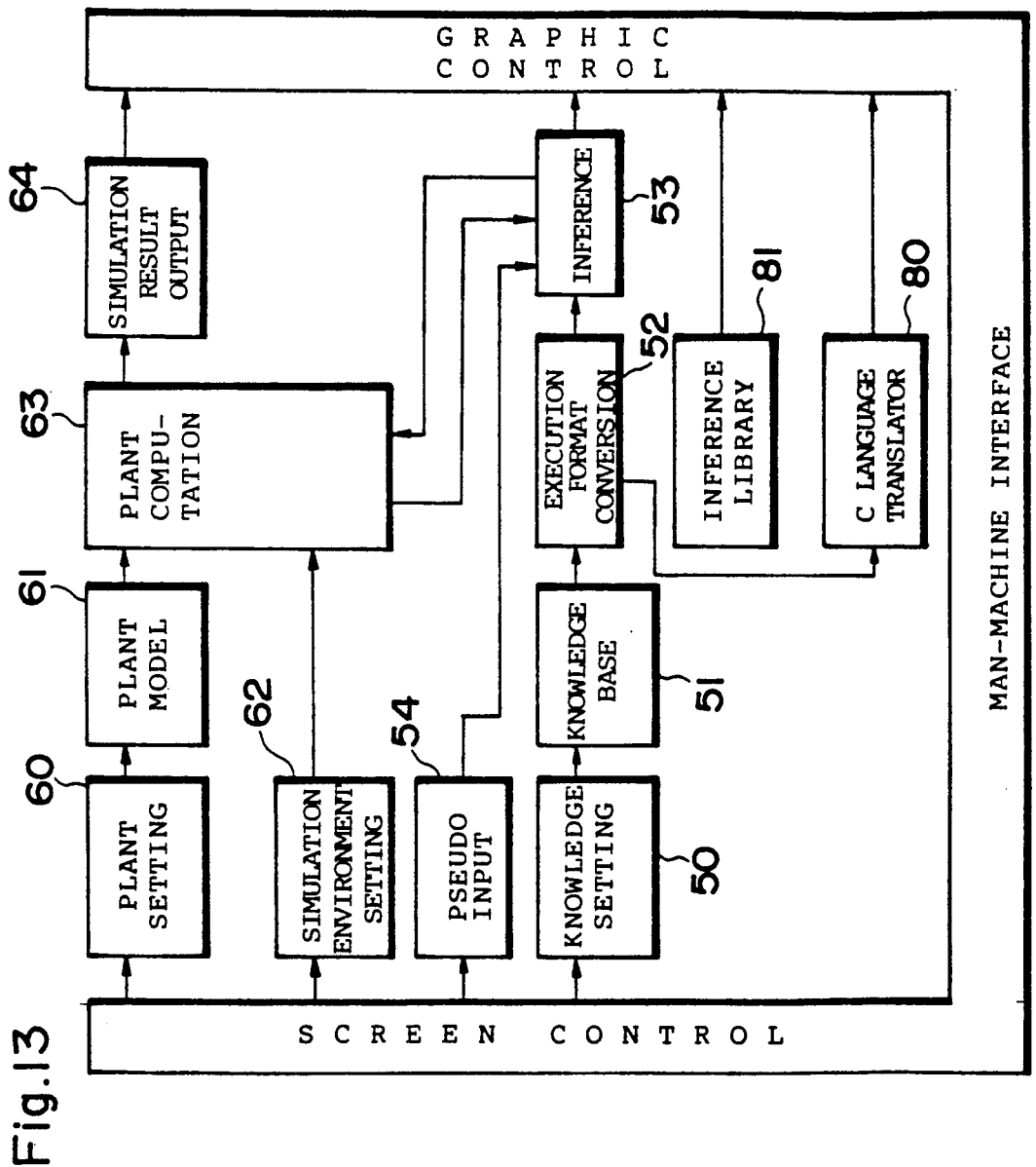
FIG. 13 is a functional block diagram showing a software constitution of a fuzzy control system development support apparatus comprising fourth embodiment.

FIG. 13 is a configuration block diagram showing, in more detail, a fuzzy control system development support apparatus in which there is particularly shown a software configuration. This apparatus may be implemented by use of, for example, a workstation. The apparatus operates on an operating system (OS), for example, UNIX. The operating system (UNIX) supervises a screen control for achieving data editing and the like on a display screen, a graphic control for displaying a simulation result and the like on the display screen, and the man-machine interface. A knowledge setting section 50 is disposed to store the fuzzy processing rules and the membership functions in a knowledge base 51. In the knowledge setting section 50, a fuzzy processing rule (to be simply referred to as a rule herebelow) is edited on the main memory and a membership function (MFS) is defined and is edited thereon.

FIG. 14 shows an editing screen utilized when a membership function is edited by use of the knowledge setting section 50. In this display screen, the operator may input data items such as input/output variable names, a fuzzy label, a comment, and lower and upper limit values of a variable name.

FIG. 15 shows an editing screen employed when an inference processing rule is edited by the knowledge setting section 50. As can be seen from this diagram, in this display screen, the operator can input six conditions as the antecedent and two conclusions as the consequent.

Figure 16:
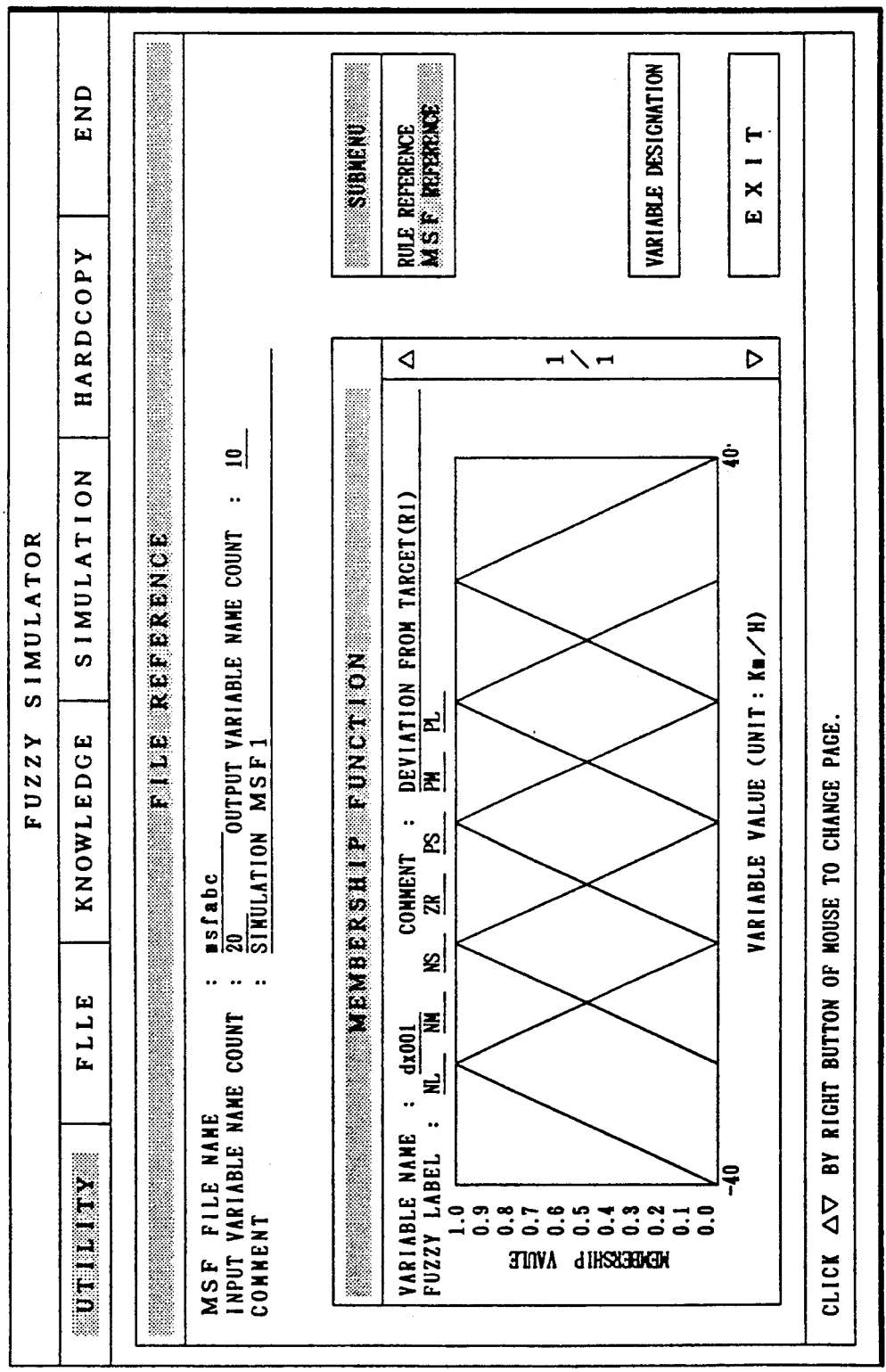

FIG. 16 shows a display screen in which a membership function inputted in the editing screen above in the utility mode is graphically displayed. In this screen, the file name of the membership function is indicated as msfabc. By using an input operation device such as a mouse, it is possible to change the page of the membership function file. The control of the input section including the mouse is achieved by the man-machine interface, whereas the graphic display operations, such as the data editing and the membership function display on the display screen, are supervised by the screen control and graphic control sections of the operating system.

The inference processing rules and membership functions stored in the knowledge base are translated to generate a file containing the contents of the knowledge base in an execution format in the execution format conversion or translation section 52. That is, based on the knowledge base, the contents thereof are converted, for example, by adding parameters such as those of inference methods, into data in a format executable by the fuzzy inference program. The execution file is then transmitted to the fuzzy inference section (to be simply referred to as an inference section herebelow) 53, which achieves a fuzzy inference on the received data to supply a result of the inference to the graphic control section.

A simple inference simulation is accomplished by means of the inference section 53 and the pseudo input section 54. The pseudo input section 54 supplies pseudo data to the knowledge base 51. Input data include the single data and the consecutive data, whereas the input format allows data including an integer, a real number, and an exponent data item. The consecutive data may be retained as an input data file. The pseudo data is subjected to input editing by use of the screen control section.

The result of an inference accomplished by the inference section 53 is sent to the graphic control section so as to be displayed as the final fuzzy output and determinant values. Incidentally, when pseudo data items are consecutively inputted, the inference results are attained as a graphic display with the X and Y axes representing the input data and the inference results, respectively.

In order to conduct a simulation of a control system, a plant setting section 60 is utilized for establishing a model 61 of a plant as a control object, a simulation environment setting section 62, a plant computing section 63, an output section 64 for outputting a result of the simulation, the knowledge base 51, and the inference section 53.

For simulation of the control system, as shown in the configuration of FIG. 12, a fuzzy inference engine, set as a controller and a plant model established by use of parameters, are configured in a control system of a closed loop, thereby achieving the simulation. This provision enables the fuzzy control to be simply evaluated. In the simulation of this control system, various kinds of environmental conditions may be specified. The simulation environment setting section 62 is disposed for this purpose. That is, by use of key inputs, there can be set the environmental condition items such as a simulation period of time, a step of time (sampling period of time), a target value format (step response, lump response) and a magnitude or gradient, presence/absence of an external disturbance, a disturbance format (step, pulse, sine wave), a disturbance application position (the input or output side of model) and an application start and end points of time, a magnitude of the external disturbance, a frequency in a case of a sine wave, each initial state amount of the system degree, gains on input and output sides of the controller (fuzzy inference engine), and an output format (the position type to output a controller output itself or the velocity type to accumulate control outputs to attain a final output). The plant model 61 can be set through key-in operations of the system degree, the input/output degrees, and the idle time.

Figure 19:
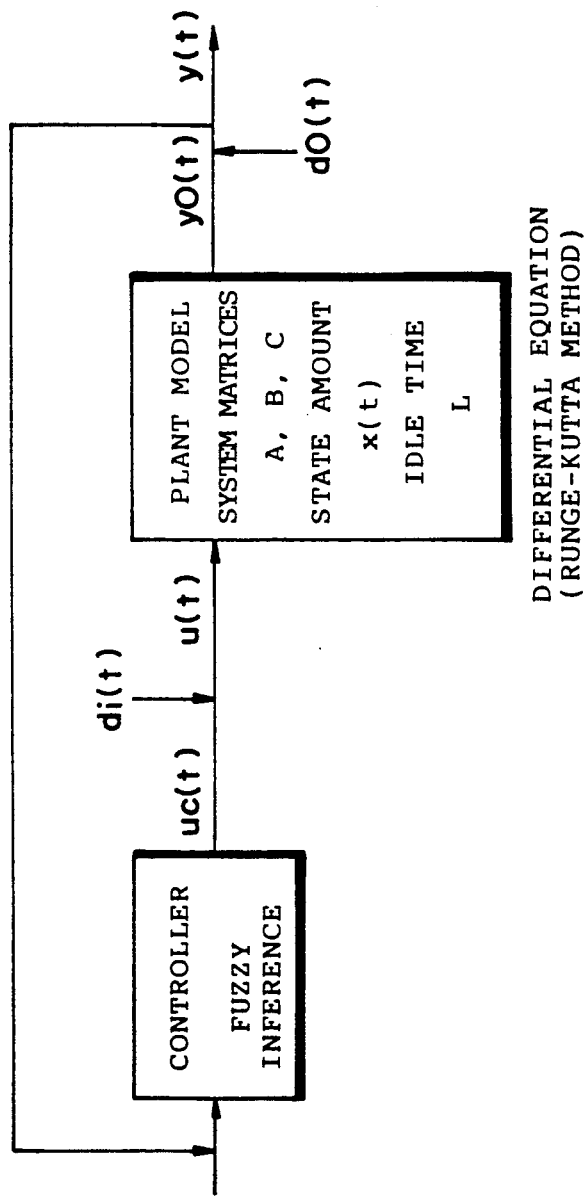
FIG. 19 is a schematic diagram showing the configuration of a closed loop system associated with a control system simulation.
Figure 20:
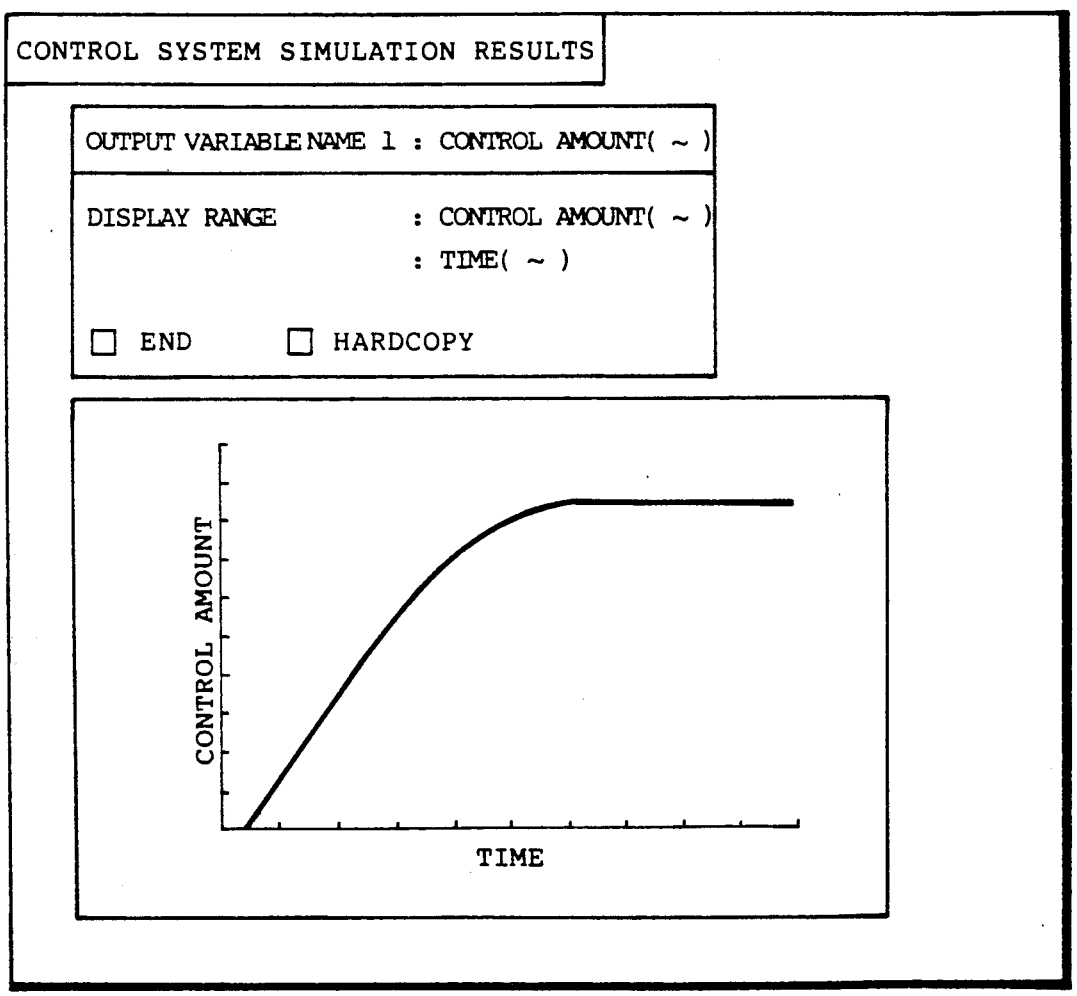
FIGS. 20 to 22 are diagrams schematically showing display examples of control system simulation results.
Figure 21:
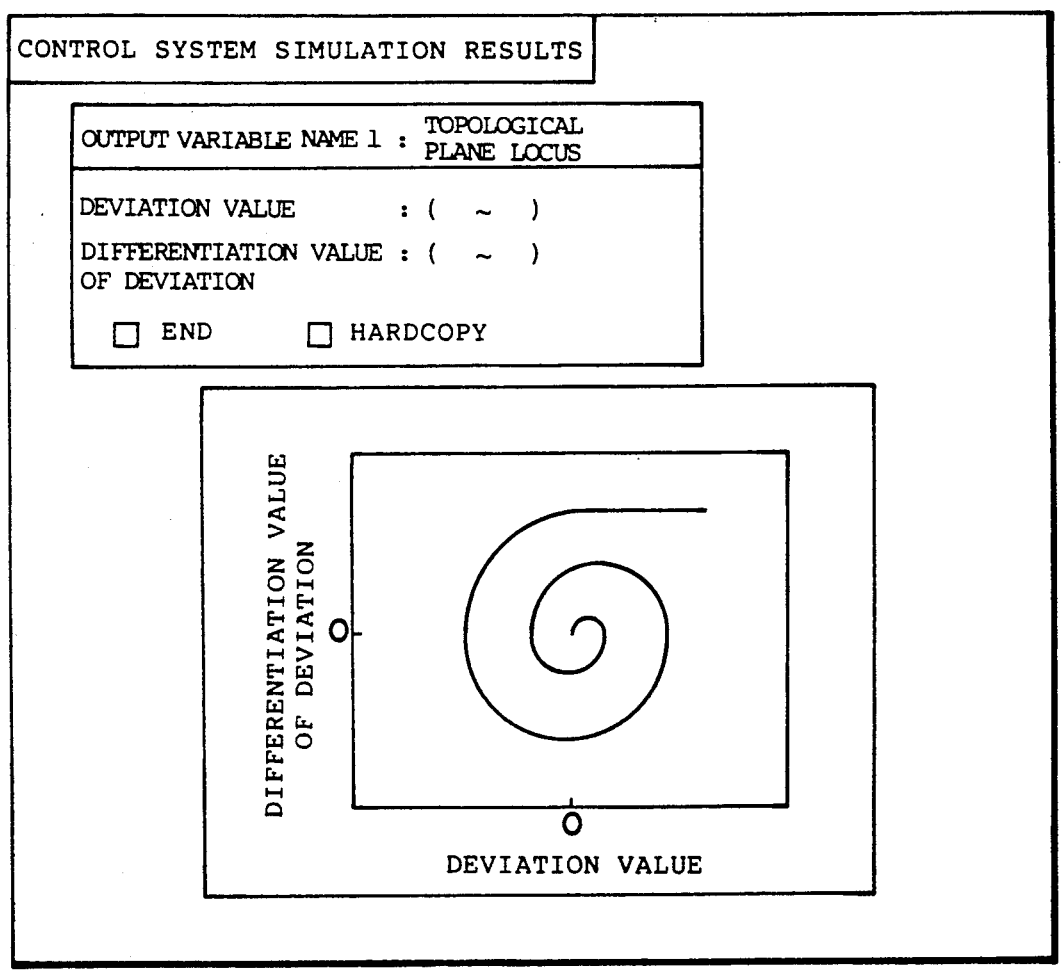
Figure 22:
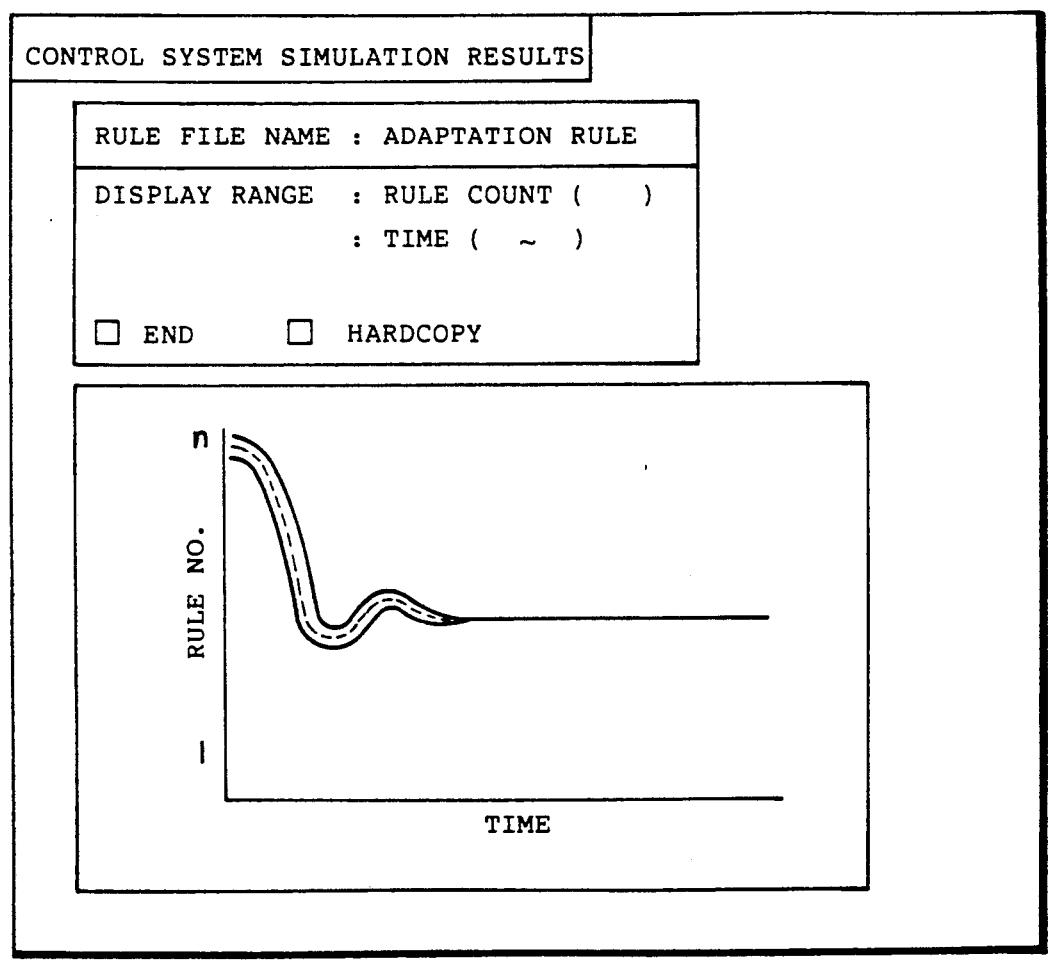

The plant model 61 may be represented in a format shown in FIG. 17. The plant model 61 expressed with these differential equations and the inference section 53 are linked with each other through a closed loop. The plant model 61 is then supplied with an inference result as a control input, whereas the solutions of the differential equations representing the plant model 61 are returned as a plant output to the inference section 53. The closed loop computation is repeatedly achieved m times (m = simulation period of time/step period of time) such that the controller output (the output from the inference section 53) and the plant output at the respective iteration are kept as simulation results in the simulation result output section 64. By the way, it is assumed that the plant model 61 is represented with differential equations according to the Runge-Kutta method and the plant computation section 63 accomplishes the computation, as shown in FIGS. 18a to 18c. FIG. 19 shows the closed loop control system. FIG. 18a shows a procedure to obtain an input to the plant model (control objective model). The differential equations are solved as shown in FIG. 18b. The control amount is obtained through the procedure of FIG. 18c. The simulation results thus attained are passed to the graphic control section, so that the respective data items of the controller output (manipulated variable) and the plant output are displayed as a graph in a time domain on a cathode-ray tube (CRT) screen. FIG. 20 is a diagram showing an example of simulation results of a plant output (control amount). Simulation results also include such items as those shown in FIGS. 21 and 22. FIG. 21 shows a screen graphically showing as a topological plane locus the differential values of the deviation with respect to the deviation values, whereas FIG. 22 shows adaptive degrees of fuzzy rules. Incidentally, particularly, in this embodiment as shown in FIG. 22, since the adaptive degree can be graphically shown for each rule, it is advantageous to evaluate the rule in a short period of time.

FIGS. 23 and 24 shows a screen employed to establish a plant model and a screen used to set a simulation environment condition.

Moreover, this system includes a translator 80 to translate the knowledge base 51 into the C language and an inference library 81 in which contents are beforehand prepared in the C language. The C language translator 80 translates into source programs of the C language the rules and membership functions set in the knowledge setting section 50. The inference library 81 is to be loaded at least with the following items:

① Set data to an input variable.
② Execute an inference.
③ Read a value of an output variable.
④ Read a value of an input variable.
⑤ Dump various data items.

The contents of inference library 81 and the source programs of the C language thus translated and stored in the knowledge base by the C language translator 80 are used to develop application programs depending on various microprocessors.

Figure 25:
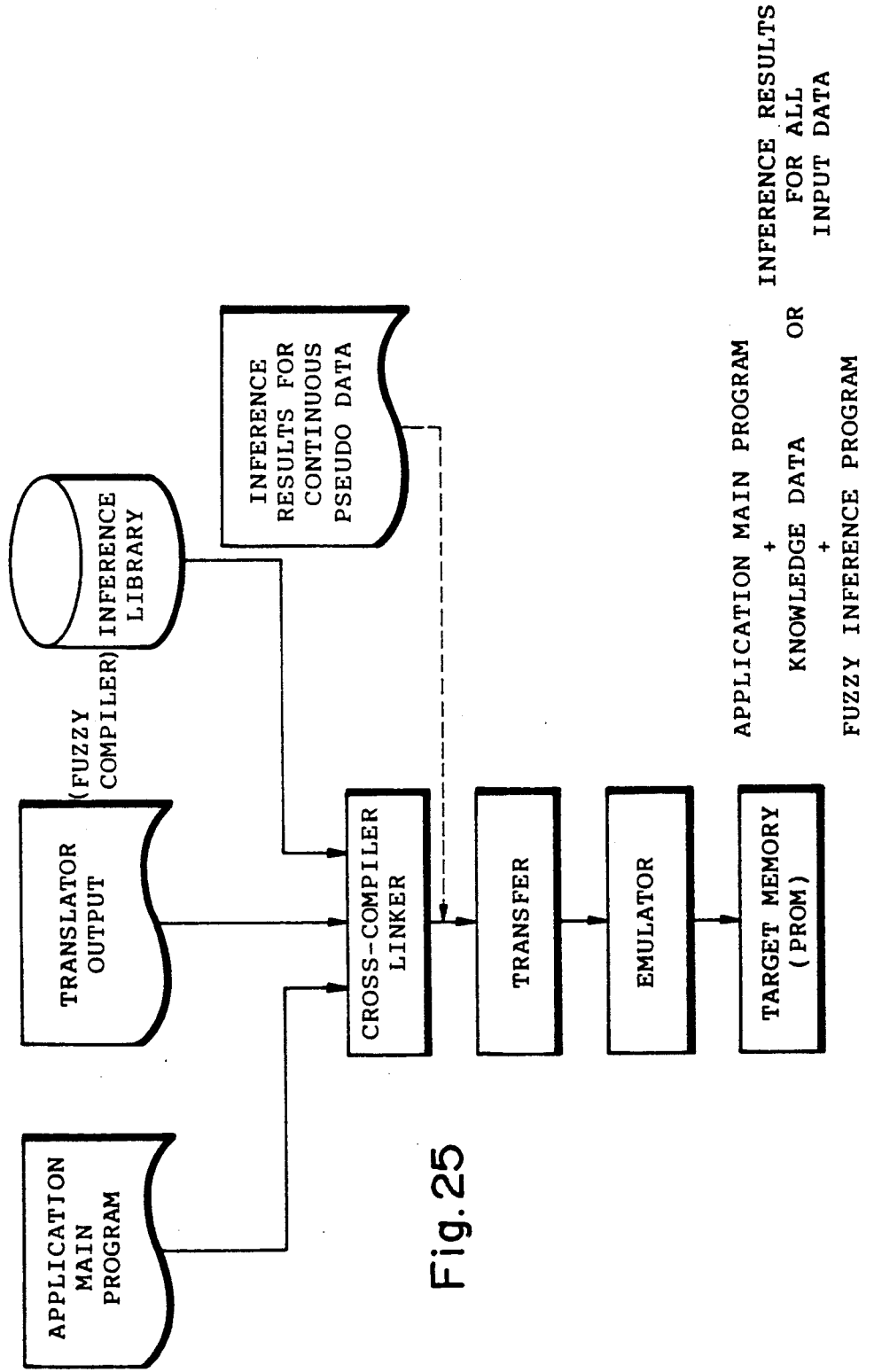
FIG. 25 is a flowchart of an operation to store in a target memory an output result from a support apparatus according to the present invention.
Figure 26A:
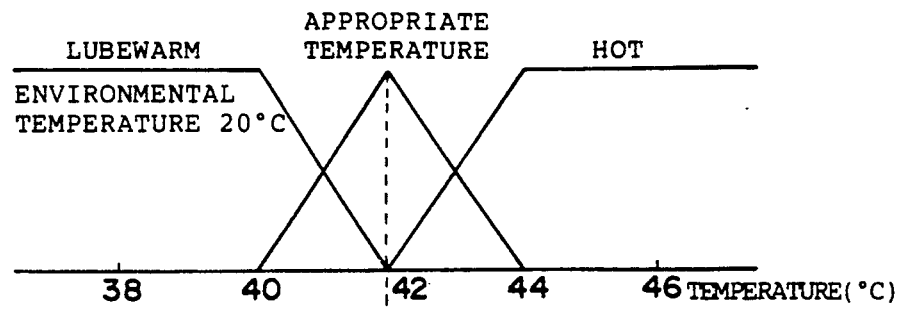
FIGS. 26a to 26c are graphs showing states in which the shapes of membership functions alter depending on outdoor or environmental temperatures.
Figure 26B:
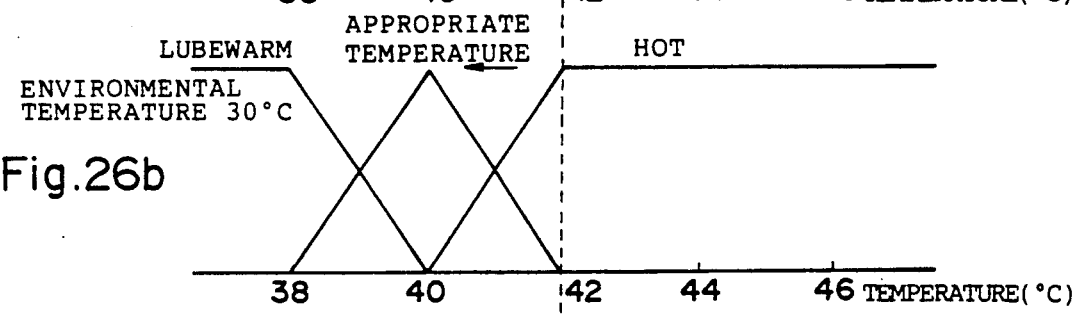
Figure 26C:
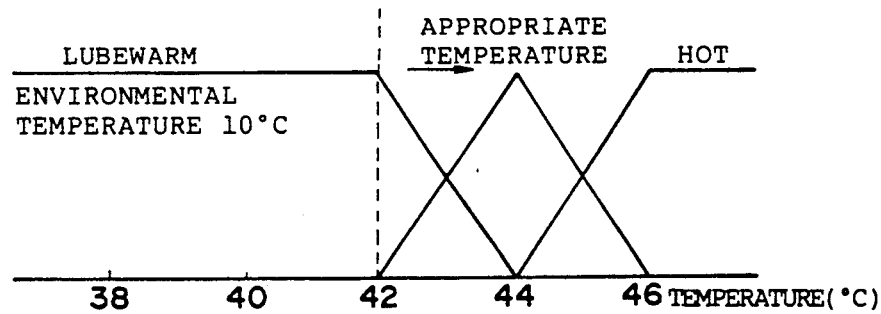
Figure 27:
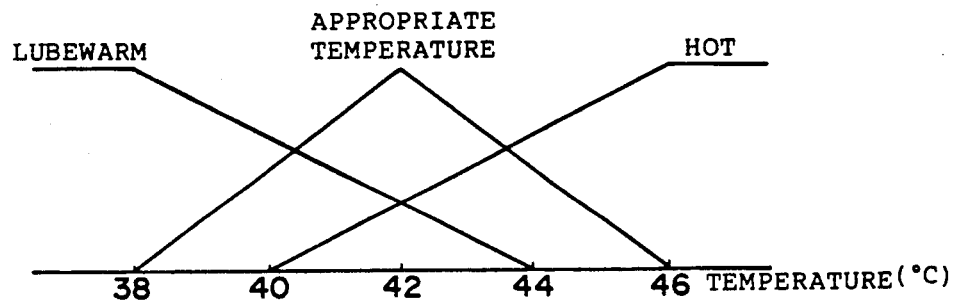
FIG. 27 is an explanatory diagram useful to explain an example of a membership function used in a fuzzy inference process.
Figure 28:
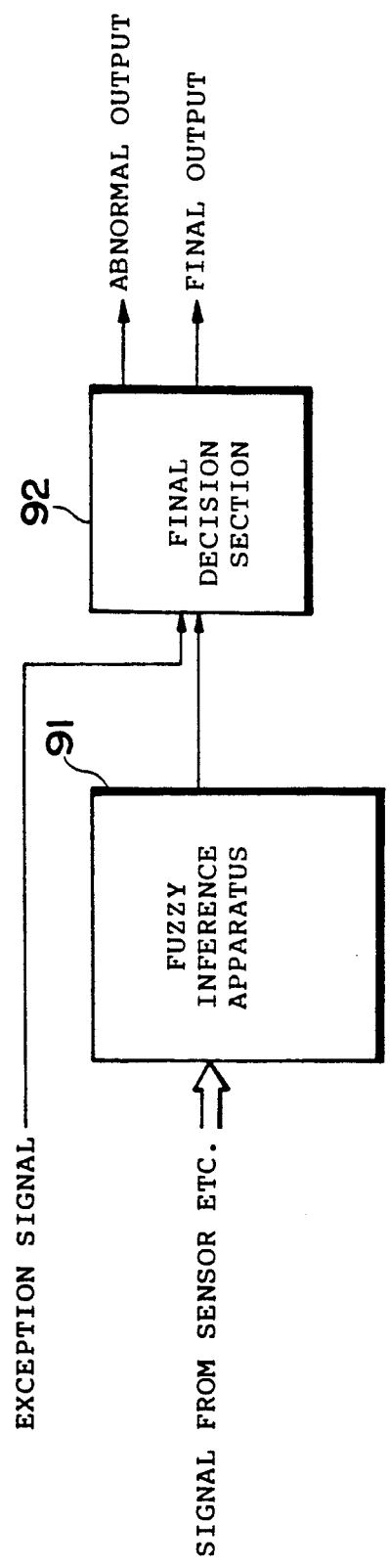
FIGS. 28 and 29 are block diagrams showing fuzzy inference apparatuses.
Figure 29:

FIG. 25 shows a procedure employed when a software fuzzy program is stored in a target memory. An application program prepared in the C language, for example, a main program to control a temperature adjuster and the C language translator output and the inference library output respectively produced from the support apparatus shown as an embodiment in FIG. 13 are processed by use of a cross-compiler for a microprocessor as a target machine. The compilation results are further processed through a linker and a debugger to create an object program. The produced object program is then delivered to an emulator, which writes the object code of the program in a target memory PROM. Through the procedure above, the fuzzy temperature adjuster control program is stored in the target memory. The target memory including the control program is installed in a controller board achieving a control of the temperature adjuster. In this system, since inference results can be obtained for consecutive pseudo input data items, the inference results can be directly stored through the emulator into the target memory. Also in this situation, the target memory is directly mounted, for use, on the CPU board of the actual machine.

While the particular embodiments of the invention have been shown and described, it will be obvious to those skilled in the art that various changes and modifications may be made without departing from the present invention in its broader aspects.

We claim:

1. A fuzzy control system development support apparatus comprising:
   a knowledge base storing therein fuzzy rules and membership functions previously set;
   simulation means for generating and supplying a pseudo input;
   means for performing a fuzzy inference on said pseudo input supplied from said generating means in accordance with said fuzzy rules and membership functions stored in said knowledge base;
   means for outputting an inference result obtained by said inference performing means;
   a display means for enabling the editing of said fuzzy rules and membership functions; and
   translator means for translating said knowledge base into an arbitrary language.

2. A fuzzy control system development support apparatus comprising:
   a control objective model to be controlled in a simulation;
   a knowledge base storing therein fuzzy rules and membership functions previously set;
   a display means for enabling editing of said fuzzy rules and said membership functions stored in said knowledge base;
   translation means for translating said knowledge base into an arbitrary language;
   means for generating and supplying a pseudo input;
   means for performing fuzzy inferences on said pseudo input supplied from said generating means and feedback from said model in accordance with said fuzzy rules and membership functions stored in said knowledge base and for supplying the inference result to said model; and
   means for outputting at least one status of said model controlled by said fuzzy inference performing means.

* * * * *

UNITED STATES PATENT AND TRADEMARK OFFICE
CERTIFICATE OF CORRECTION

PATENT NO. : 5,193,144
DATED : March 9, 1993
INVENTOR(S) : Yasuhiro Tsutsumi, Et Al.

It is certified that error appears in the above-identified patent and that said Letters Patent is hereby corrected as shown below:

On the title page;

[73] Assignee

"Shimano, Inc., Osaka, Japan" should read --Omron Corporation, Kyoto, Japan--.

Signed and Sealed this

Twenty-first Day of March, 1995

Attest:

BRUCE LEHMAN

*Attesting Officer*    *Commissioner of Patents and Trademarks*

UNITED STATES PATENT AND TRADEMARK OFFICE
Certificate

Patent No. 5,193,144                                                                           Patented: March 9, 1993

On petition requesting issuance of a certificate for correction of inventorship pursuant to 35 U.S.C. 256, it has been found that the above-identified patent, through error and without deceptive intent, improperly sets forth the inventorship.

Accordingly, it is hereby certified that the correct inventorship of this patent is: Yutaka Ohtsubo, Takatsuki, Japan.

Signed and Sealed this Eighteenth Day of July, 2000.

<div style="text-align: right;">
TARIQ HAFIZ<br>
*Supervisory Patent Examiner*<br>
Art Unit 2762
</div>